(12) United States Patent
Maxwell et al.

(10) Patent No.: US 7,226,559 B2
(45) Date of Patent: Jun. 5, 2007

(54) METHOD FOR MOLDING STRUCTURES

(75) Inventors: Michael K. Maxwell, Long Beach, CA (US); Richard J. Gardiner, Murray, UT (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 137 days.

(21) Appl. No.: 10/000,148

(22) Filed: Dec. 4, 2001

(65) Prior Publication Data

US 2002/0069962 A1   Jun. 13, 2002

Related U.S. Application Data

(60) Provisional application No. 60/254,080, filed on Dec. 8, 2000.

(51) Int. Cl.
*B29C 70/48* (2006.01)
*B32B 3/12* (2006.01)

(52) U.S. Cl. ............... 264/511; 264/257; 264/258; 264/259; 264/263; 264/313; 264/314; 264/317; 264/324; 264/571; 156/245; 156/286; 156/307.1; 156/307.7

(58) Field of Classification Search .......... 264/102, 264/510–512, 257–258, 571, 313–314, 317, 264/324, 209, 203; 156/286, 350, 327.1, 156/322.2
See application file for complete search history.

(56) References Cited

U.S. PATENT DOCUMENTS

| | | |
|---|---|---|
| 2,517,902 A | 8/1950 | Luebkeman |
| 4,783,232 A | 11/1988 | Carbone et al. |
| 4,822,444 A | 4/1989 | Weingart et al. |
| 4,869,761 A | 9/1989 | Weingart et al. |
| 4,907,754 A | 3/1990 | Vaniglia |
| 4,938,824 A | 7/1990 | Youngkeit |
| 5,022,952 A | 6/1991 | Vaniglia |
| 5,023,041 A * | 6/1991 | Jones et al. ............... 264/510 |
| 5,059,377 A | 10/1991 | Ashton et al. |

(Continued)

FOREIGN PATENT DOCUMENTS

EP    0 770 472 A    5/1997

(Continued)

OTHER PUBLICATIONS

John Berry, International Search Report for International application No. PCT/US 01/43091, (Jul. 17, 2002).

(Continued)

*Primary Examiner*—Stefan Staicovici
(74) *Attorney, Agent, or Firm*—Finnegan, Henderson, Farabow, Garrett & Dunner LLP

(57) ABSTRACT

A method for molding composite structures whereby a material stack including a core having first and second opposing sides is prepared. The preparing of the material stack includes applying a fibrous support layer on at least one of the first side and the second side of the core section, applying an adhesive layer on the support layer, and applying a thermoplastic barrier layer on the adhesive layer. The method also includes preparing a resin and a mold; placing the material stack in the mold; sealing the core; infusing the mold and material stack with resin; curing the structure; and removing the structure from the mold. In one embodiment, the method creates a composite aircraft wing panel.

37 Claims, 42 Drawing Sheets

U.S. PATENT DOCUMENTS

| | | | |
|---|---|---|---|
| 5,223,067 A | | 6/1993 | Hamamoto et al. |
| 5,242,523 A | | 9/1993 | Willden et al. |
| 5,242,651 A | * | 9/1993 | Brayden et al. ............ 264/510 |
| 5,259,901 A | | 11/1993 | Davis et al. |
| 5,262,121 A | | 11/1993 | Goodno |
| 5,266,137 A | | 11/1993 | Hollingsworth |
| 5,362,345 A | | 11/1994 | Stettler et al. |
| 5,547,629 A | * | 8/1996 | Diesen et al. ............... 264/257 |
| 5,571,357 A | | 11/1996 | Darrieux et al. |
| 5,688,353 A | * | 11/1997 | Dublinski et al. .......... 156/256 |
| 5,851,336 A | * | 12/1998 | Cundiff et al. ........... 156/272.2 |
| 5,893,955 A | * | 4/1999 | Rousseau et al. ........ 156/89.22 |
| 5,897,739 A | * | 4/1999 | Forster et al. .............. 156/285 |
| 6,096,164 A | | 8/2000 | Benson et al. |
| 6,179,945 B1 | | 1/2001 | Greenwood et al. |
| 6,638,466 B1 | * | 10/2003 | Abbott ....................... 264/238 |
| 6,679,969 B1 | * | 1/2004 | Fournier et al. ............ 156/245 |
| 6,692,681 B1 | * | 2/2004 | Lunde ........................ 264/510 |

FOREIGN PATENT DOCUMENTS

| | | |
|---|---|---|
| EP | 0 786 330 A | 7/1997 |
| EP | 1 005 978 A | 6/2000 |
| FR | 2 424 470 A | 11/1979 |
| FR | 2 664 529 | 7/1990 |
| GB | 1 481 167 | 7/1977 |
| GB | 2 232 954 A | 1/1991 |
| JP | 0 4179515 A | 6/1992 |
| WO | PCT/US98/01740 | 7/1998 |

OTHER PUBLICATIONS

J. Carre, International Search Report for International application No. PCT/US 02/05094, (Aug. 2, 2002).

D.V. Rosato et al., "Filament Winding: Its Development, Manufacture, Applications, and Design," John Wiley & Sons, Inc., (1964).

A. Van Wallene, International Search Report for International application No. PCT/US01/45750 (Sep. 19, 2002).

"Filament Winding Composite Structure Fabrication," Society for the Advancement of Material and Process Engineering, 1991. (13 pages).

Entec Composite Machines Home Page, http://www.entec.com, Dec. 19, 2003. (2 pages).

McClean Anderson Home Page, http://www.mcleananderson.com, Dec. 19, 2003. (1 page).

Walsh, Paul et al., "Carbon Fiber Property Translation into Composite—A Comparison of Commercial Grade 48K Carbon Fibers Versus 12K Aerospace Fibers." (16 pages).

"The Mission: To Deliver Large-Tow Carbon Fiber in Filament Winding Applications." (21 pages).

User Manual for Cadwind NG for Windows, 1999. (4 pages).

Marchel, Oliver, "Space Qualification Program for CFRP-Prepregs Used for Design of Deployable Booms as a Main Structural Part of a Solar Sail." (12 pages).

* cited by examiner

310

1130

1160

1170

METHOD FOR MOLDING STRUCTURES

I. CROSS-REFERENCE TO RELATED APPLICATION

This application claims the benefit of U.S. Provisional Application No. 60/254,080, filed Dec. 8, 2000, titled A SMOOTH LAMINAR FLOW STRUCTURE AND METHOD OF FORMING SAME, the disclosure of which is expressly incorporated herein by reference.

II. BACKGROUND OF THE INVENTION

A. Field of the Invention

The present invention relates to a molded composite structure and a method of manufacturing a molded composite structure.

B. Background of the Invention

In general, most airplanes comprise a number of components such as a fuselage, an empennage, and wing structures. Wing structures are particularly important in the construction of airplanes because wing structures are the primary lift-producing structures and perform some of the key functions for these airplanes. For example, wing structures enable airplanes to take off and land, to change speed, and to change direction, as well as other functions. Furthermore, as one of the larger portions of the aircraft, the overall aerodynamic properties of the aircraft greatly depend on the wing structures. Finally, the cost of manufacturing the wing structures has a large impact on the overall manufacturing cost of these airplanes.

The ability of the wing structures to perform the functions discussed above directly depends on the design and construction of the wing structure. For example, the smoothness and weight of the wing structures directly impacts the wing structures ability to perform these functions.

In particular, the smoothness of the exterior of the wing structures affects the ability of the aircraft to take off and land, to change speed, and to change direction. If a wing structure has an uneven or non-smooth surface, this can create unnecessary drag, affecting the ability of the wing structures ability to perform many of the key functions. The aircraft will not be able to take off and land as easily, and it will be more difficult to alter the speed and direction of the plane during flight.

The weight of the wing structures also impacts the ability of the aircraft to take off and land, to change speed, and to change direction. The heavier the wing structures are, the more difficult it will be for the aircraft to take off and land. Further, heavier wing structures also make it more difficult to alter the speed and direction of the aircraft during flight.

The overall aerodynamic properties of an aircraft also depend on the design and construction of the wing structures. Ideally, airplanes are designed to create a smooth laminar flow of air over the aircraft. The smoother the laminar flow of air, the less energy is needed to fly the aircraft. This therefore reduces the fuel costs for the plane. If the wing structures are not designed to be aerodynamically sound, this smooth laminar flow will be disrupted. For example, if the wing structures do not have a smooth surface, added drag could result on portions of the wing structures. This will therefore increase the amount of fuel needed for flight.

The cost of manufacturing the wing structures also depends on the design and construction of the aircraft. The cost of the material used to manufacture the wing structures as well as the labor costs of manufacturing the wing structures greatly impacts the overall cost of the wing structures. Therefore, the design and construction of wing structures are particularly important in the manufacture of airplanes.

Currently, aircraft manufacturers use a number of different methods to manufacture wing structures. One such process uses a thin aluminum material to construct the structure. This process involves the manufacture of sheets of aluminum, which are machined and attached to one another to form the wing structures. Aluminum provides an inexpensive source of wing structure material. However, the manufacture of wing structures from aluminum is labor-intensive. A large amount of time is spent in manufacturing and assembling the aluminum sheets. In addition, while aluminum is a light-weight metal, it is heavier than other non-metal materials that could be used. Therefore, it causes the wing structure to be unduly heavy. Finally, the mechanical attachments associated with aluminum wing structures decrease the smoothness of the wing structure.

Another current process uses wet lay-up composites to manufacture wing structures. Composite materials are light and inexpensive, and unlike aluminum, can produce a smooth structure. However, like aluminum, constructing wing structures using wet lay-up composite materials is labor-intensive and expensive. The process of forming composite materials into the shape of a wing structure with this method requires complicated machining and tooling. Further, while composite materials are lighter than other materials, the wet lay-up process requires the use of a large amount of composite material. This increases the weight of the wing structures and thereby affects the performance of the wing structures.

Another current process to manufacture wing structures uses hand laid-out prepreg. Like composite materials, hand laid-out prepreg also results in a smooth structure. However, unlike aluminum and composite materials, the construction of wing structures from hand laid-out prepreg is not labor-intensive. However, prepreg is very expensive. Therefore, this method greatly increases the manufacturing costs.

Therefore, it is desirable to provide a molded composite structure that utilizes inexpensive material, is constructed using a nonlabor-intensive process, and provides a smooth laminar flow surface.

Methods and structures in accordance with the invention provide for a molded composite structure that is inexpensive, not labor intensive to produce, and has a smooth laminar flow surface.

III. SUMMARY OF THE INVENTION

A method consistent with the present invention provides a method of manufacturing a molded composite structure, comprising: preparing a material stack, wherein the material stack comprises a core section having first and second opposing sides; preparing a resin; preparing a mold; placing the material stack in the mold; sealing the core section; infusing the mold and material stack with the resin to form the structure; curing the structure; and removing the structure from the mold.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and together with the description, serve to explain the principles of the invention.

V. DESCRIPTION OF THE EMBODIMENTS

A. Introduction

Methods and structures in accordance with the present invention will now be described with respect to an embodiment of a molded composite structure, an aircraft wing panel. The invention as claimed, however, is broader than wing panels and extends to other molded composite structures, such as, for example, a full wing structure, inserts, controls, empennages, fuselages, and stabilizers. In addition, the invention as claimed, is broader than aircraft structures and extends to automotive, forklift, watercraft, and building structures.

B. Methods and Structures

Figure 1:
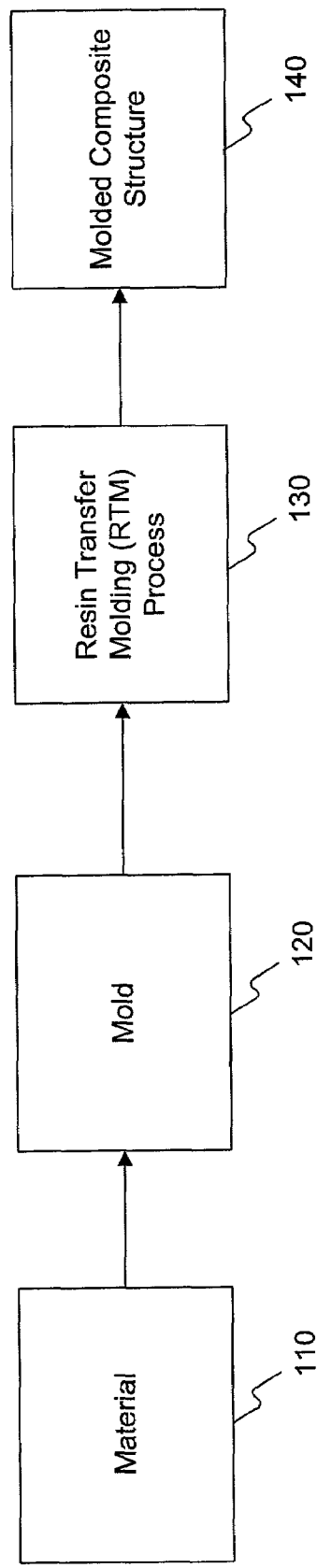
FIG. 1 is a block diagram illustrating the components for manufacturing a molded composite structure consistent with an embodiment of the invention.

FIG. 1 is a block diagram illustrating the components for manufacturing a molded composite structure consistent with an embodiment of the invention. As shown in FIG. 1, the integration of a material (block 110), a mold (block 120), and a Resin Transfer Molding ("RTM") process results in a molded composite structure 140 (for example, a wing panel).

Block 110 includes the selection and preparation of materials to be used in manufacturing the molded composite structure. Block 120 includes the preparation of a mold to form the desired shape of the molded composite structure. RTM process 130 includes the placing of material 110 in mold 120, infusing material 110 with resin (not shown, but described in detail below), and the curing of material 110 and the resin. Molded composite structure 140 represents the result of RTM process 130 using material 110 and mold 120. For example, molded composite structure 140 may be a wing panel. Molded composite structure 140 may also be another structure. This implementation is merely exemplary, and other implementations may also be used.

Figure 2A:
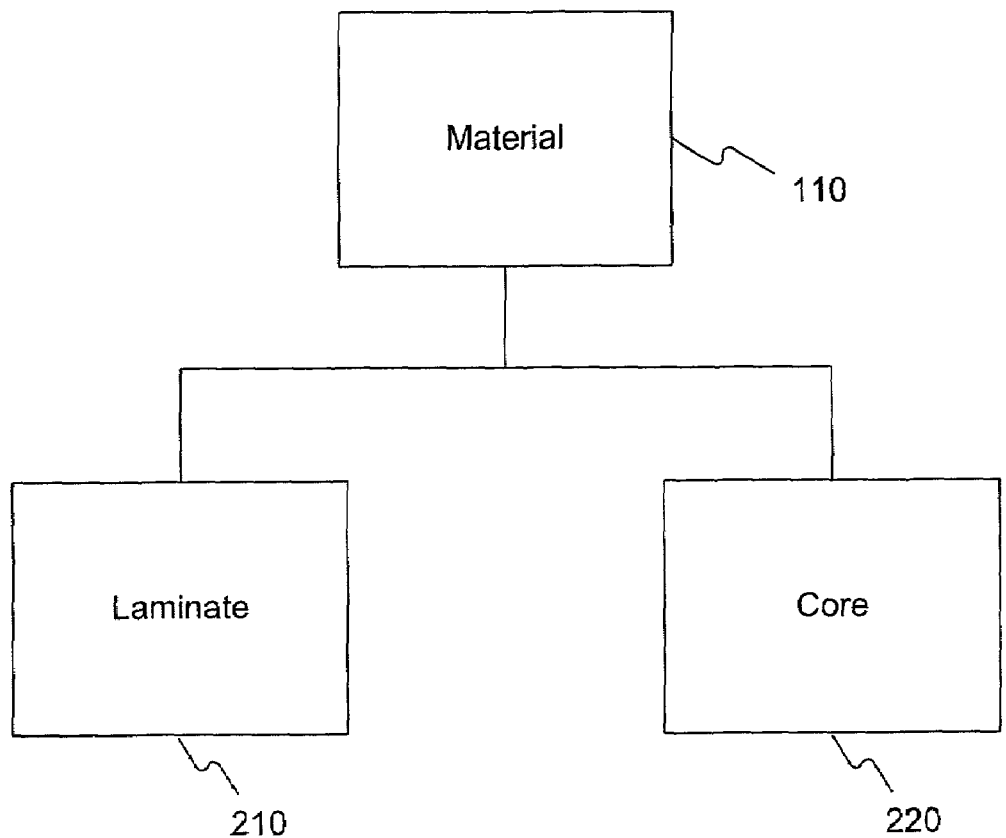
FIG. 2A is a block diagram illustrating manufacturing a molded composite structure consistent with an embodiment of the invention, as shown in FIG. 1.

FIG. 2A is a block diagram illustrating manufacturing a molded composite structure consistent with an embodiment of the invention, as shown in FIG. 1. As shown in FIG. 2A, material 110 comprises at least one of the following exemplary materials: laminate 210 and core 220. Material 110 may also comprise laminate 210, core 220, or some combination of laminate 210 and core 220. Material 110 may also include other materials.

Laminate 210 includes any laminate material suitable for forming a molded composite structure. Core 220 includes any sandwich core materials. In one implementation, core 220 includes sandwich core materials such as those used in spar structures and those used as sandwich elements in a skin section between layers of laminate. These implementations are merely exemplary, and other implementations may also be used.

Figure 2B:
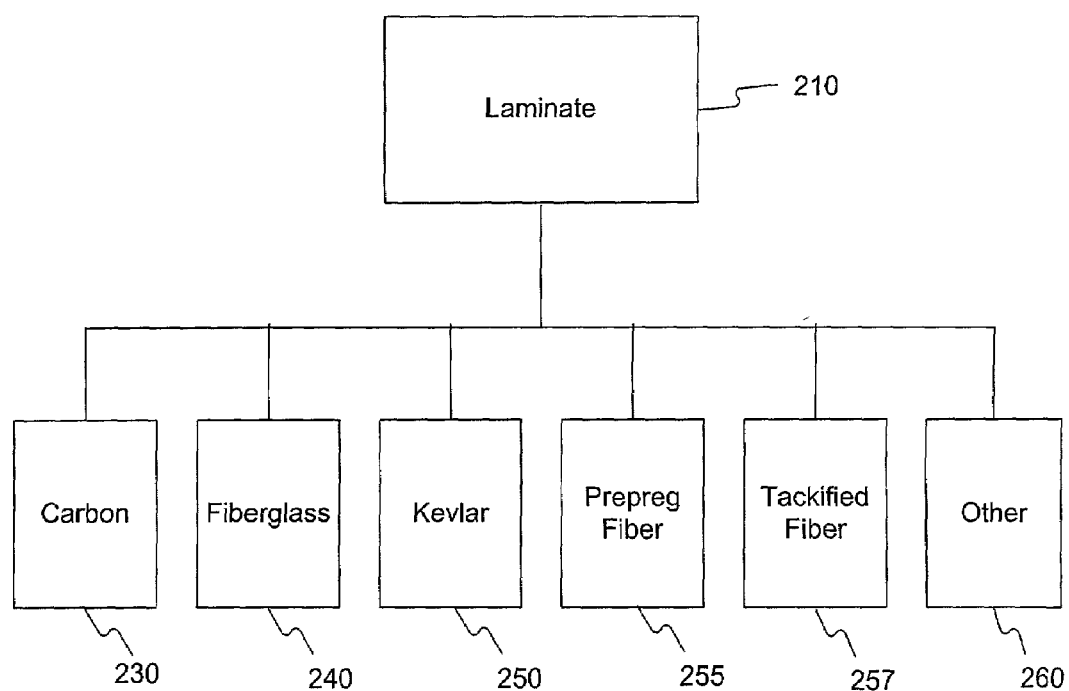
FIG. 2B is a block diagram illustrating laminate for manufacturing a molded composite structure consistent with an embodiment of the invention, as shown in FIG. 2A.

FIG. 2B is a block diagram illustrating laminate for manufacturing a molded composite structure consistent with an embodiment of the invention, as shown in FIG. 2A. As shown in FIG. 2B, several types of laminate 210 may be used in the manufacture of a molded composite structure, such as a wing panel. In one implementation, laminate 210 includes any fiber materials. For example, laminate 210 may include carbon 230, fiberglass 240, Kevlar 250, prepreg fiber 255, tackified fiber 257, or other types of laminate 260, such as aramid fibers, or any combination of the above mentioned laminates. These fibers may be used individually or woven into a fabric or sheet. These implementations are merely exemplary, and other implementations may also be used.

Figure 2C:
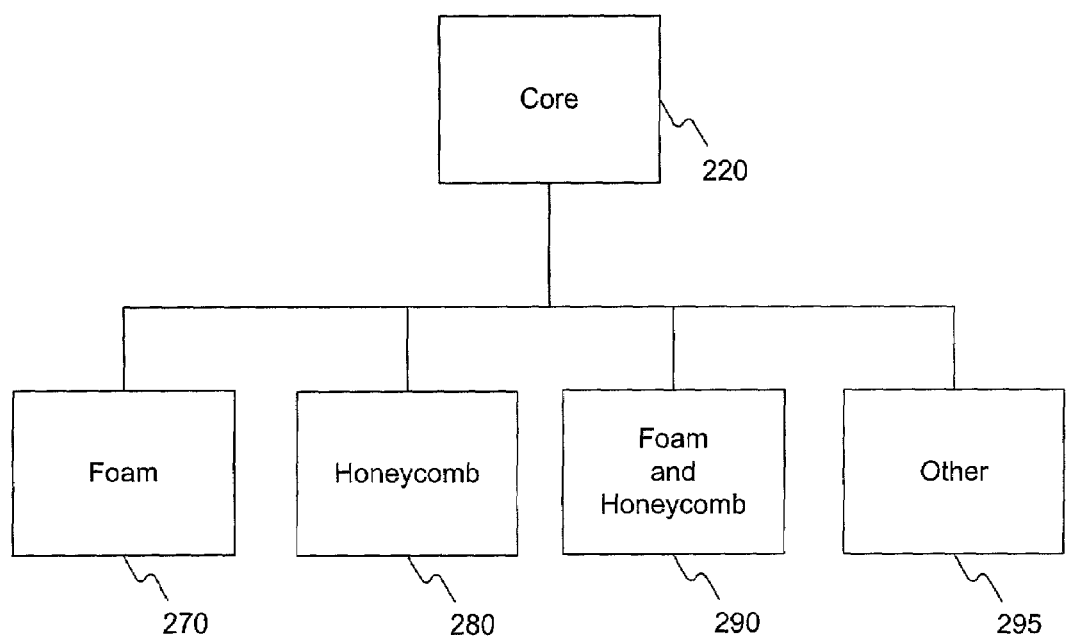
FIG. 2C is a block diagram illustrating core for manufacturing a molded composite structure consistent with an embodiment of the invention, as shown in FIG. 2A.

FIG. 2C is a block diagram illustrating core for manufacturing a molded composite structure consistent with an embodiment of the invention, as shown in FIG. 2A. As shown in FIG. 2C, core 220 includes foam 270, honeycomb 280, foam and honeycomb 290, or other 295. Foam 270 may be made from high temperature thermo plastics that have been foamed. Honeycomb 280 may be made from metal foils or plastic materials along with natural or synthetic fibers formed into paper. Honeycomb 280 may also be made from metallic materials, such as aluminum, stainless steel, or titanium, or from non-metallic materials, such as aramid fibers or paper. Honeycomb 280 resembles natural bee honeycomb. Foam and honeycomb 290 includes any combination of foam 270 and honeycomb 280. Other 295 includes other types of core 220. These implementations are merely exemplary, and other implementations may also be used.

Figure 3A:
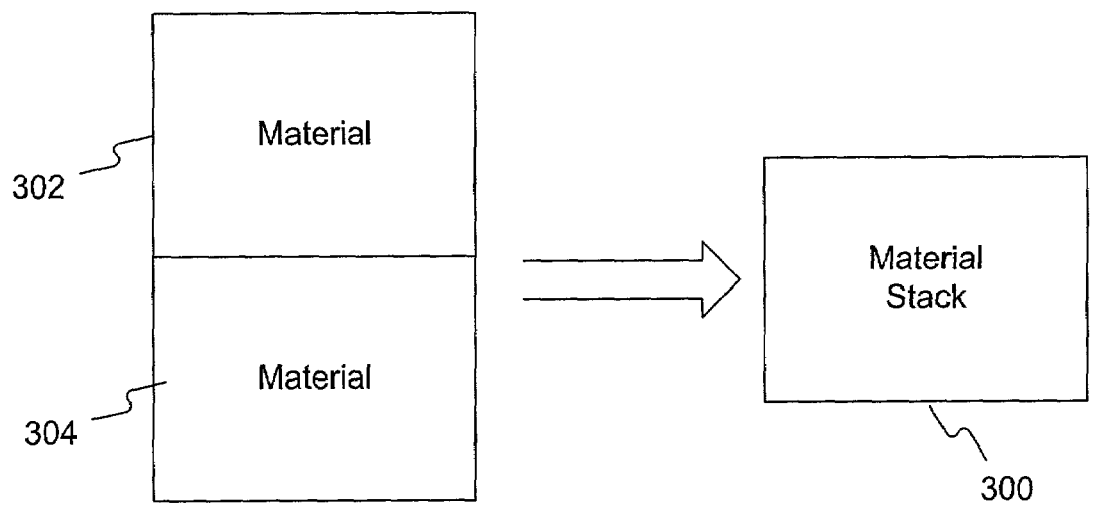
FIG. 3A is a block diagram illustrating a material stack for manufacturing a molded composite structure consistent with an embodiment of the invention, as shown in FIGS. 2A-2C.

FIG. 3A is a block diagram illustrating a material stack for manufacturing a molded composite structure consistent with an embodiment of the invention, as shown in FIGS. 2A-2C. As shown in FIG. 3A, a material stack 300 comprises layers of materials. In one implementation, material stack 300 comprises one layer of material 302 and a second layer of material 304. However, material stack 300 may have any number of layers of material. In one implementation, material 302 and material 304 are one of the materials described in FIGS. 2A-2C. This implementation is merely exemplary, and other implementations may also be used.

In one implementation, material 302 may be applied directly on top of material 304 to form material stack 300 using any of a number of well-known methods. In another implementation, an adhesive layer (not shown) is applied between material 302 and material 304. Material 302 and material 304 may be applied with a specific orientation to increase the strength of material stack 300. These implementations are merely exemplary, and other implementations may also be used.

In one implementation, material 110 (described in FIG. 1) includes material stacks, such as material stack 300. As described in FIG. 1, material 110 is placed in mold 120, where it undergoes RTM process 130 to form molded composite structure 140.

Figure 3B:
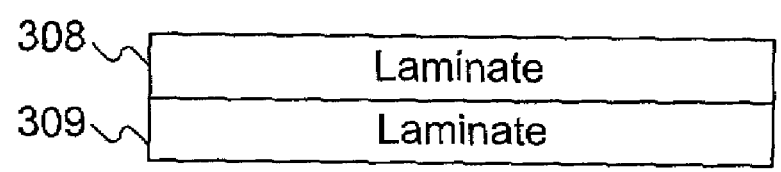
FIG. 3B illustrates a material stack comprising laminate materials for manufacturing a molded composite structure consistent with an embodiment of the invention, as shown in FIG. 3A.

FIG. 3B illustrates a material stack comprising laminate materials for manufacturing a molded composite structure consistent with an embodiment of the invention, as shown in FIG. 3A. As shown in FIG. 3B, a material stack 306 comprises layers of materials. In one implementation, material stack 306 comprises one layer of laminate 308 and a second layer of laminate 309. However, material stack 306 may have any number of layers of material. In one implementation, laminate 308 and laminate 309 are one of the materials described in FIG. 2B. This implementation is merely exemplary, and other implementations and materials may also be used.

Figure 3C:
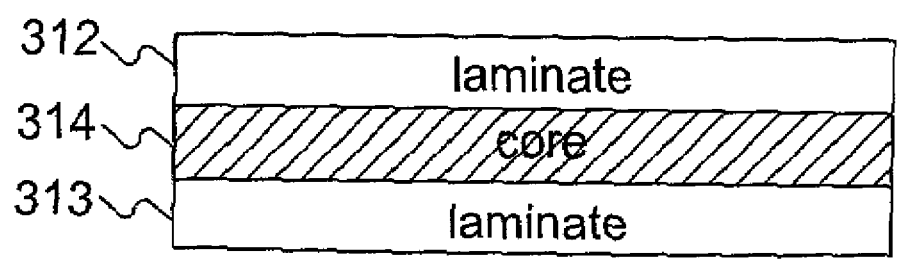
FIG. 3C illustrates a material stack comprising laminate and core materials for manufacturing a molded composite structure consistent with an embodiment of the invention, as shown in FIG. 3B.

FIG. 3C illustrates a material stack comprising laminate and core materials for manufacturing a molded composite structure consistent with an embodiment of the invention, as shown in FIG. 3B. As shown in FIG. 3C, a material stack 310 comprises a layer of core 314 surrounded by two layers of laminate 312 and 313. In this implementation, the use of core 312 increases the strength of material stack 310. In another implementation, the number of layers of laminate 312 and 313 on one side of core 314 differs from the number of layers as on the other side of core 314 (i.e., one side has more or less layers than the other side). In one implementation, core 314 and laminates 312 and 313 include those materials described above in FIGS. 2B-2C. These implementations are merely exemplary, and other implementations and materials may also be used.

Figure 3D:
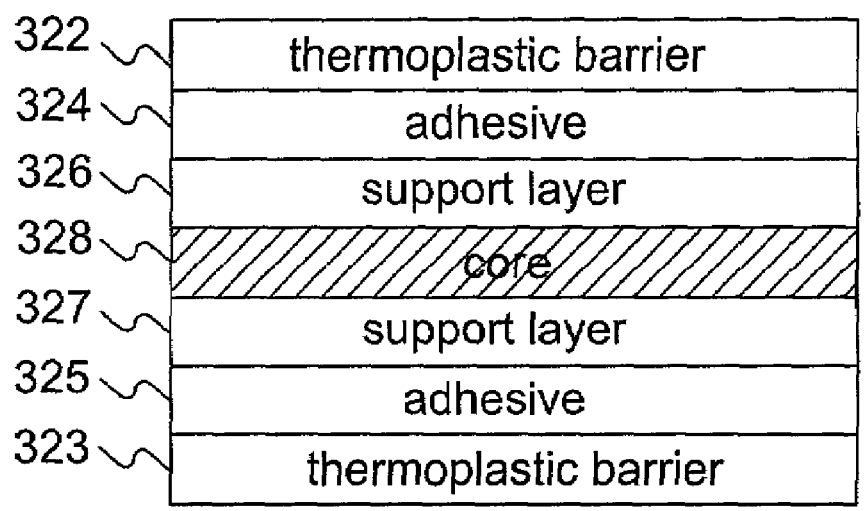
FIG. 3D depicts a sealed core for manufacturing a molded composite structure consistent with an embodiment of the invention, as shown in FIG. 3C.

FIG. 3D depicts a sealed core for manufacturing a molded composite structure consistent with an embodiment of the invention, as shown in FIG. 3C. As shown in FIG. 3D, in one implementation, core 328 may be sealed by thermoplastic barriers 322 and 323 to create sealed core 320. In this implementation, adhesives 324 and 325 and support layers 326 and 327 are also included between the thermoplastic barriers 322 and 323. This implementation is merely exemplary, and other implementations and materials may also be used.

In one implementation, core 328 is formed of one of the materials described above in FIG. 2C. During RTM process 130 (described in FIG. 1), resin may intrude into core 328. In one implementation, as shown in FIG. 3D, thermoplastic barriers 322 and 323 are used to seal core 328 to act as barriers and prevent intrusion of resin into core 328. In one implementation, thermoplastic barriers 320 and 321 are constructed of bondable Teflon, Mylar, or Ultem. For example, Melenx 454, a type of bondable Mylar, may be used. Further, thermoplastic barriers 322 and 323 may be formed of materials resistant to processing pressures and temperatures so as to maintain seal of core 328, such as, for example during RTM process 130 as described in FIG. 1. These implementations are merely exemplary, and other implementations and materials may also be used.

As shown in FIG. 3D, in one implementation, adhesives 324 and 325 are adhesives used to bond thermoplastic barriers 322 and 323 to core 328. In one implementation, adhesives 324 and 325 are film adhesives comprising epoxy materials, such as epoxy #NB185 manufactured by Newport. Adhesives 324 and 325 may be applied directly to core 328, directly to thermoplastic barriers 322 and 323, or on both core 328 and thermoplastic barriers 322 and 323. These implementations are merely exemplary, and other implementations may also be used.

As further shown in FIG. 3D, in one implementation, support layers 326 and 327 are placed between core 328 and adhesives 324 and 325 to provide added strength to material stack 316. In one implementation, support layers 326 and 327 are manufactured from glass or scrim. In another implementation, support layers 326 and 327 are made of fiberglass, woven cloth, chopped matte, plastic fibers, and/or organic fibers. In these implementations, adhesives 324 and 325 will bond core 328, support layers 326 and 327 and thermoplastic barriers 322 and 323 together, respectively. These implementations are merely exemplary, and other implementations and materials may also be used.

In addition, during RTM process 130 (described in FIG. 1), in one implementation, a vacuum may be drawn on material stack 320. In this implementation, support layers 326 and 327 allow for a vacuum path (not shown) for evacuation of core 328. This implementation is merely exemplary, and other implementations may also be used.

After application of these layers, core 328 is cured to seal thermoplastic barriers 322 and 323 to core 328. In one implementation, core 328 is cured at the same time that the molded composite structure (i.e. wing panel) is cured. In another implementation, core 328 may be cured prior to its use in the manufacturing process. These implementations will be described in more detail below. In addition, FIG. 3D depicts a core that has been sealed on both sides. However, core 328 may be sealed on only one side. These implementations are merely exemplary, and other implementations may also be used.

Figure 3E:
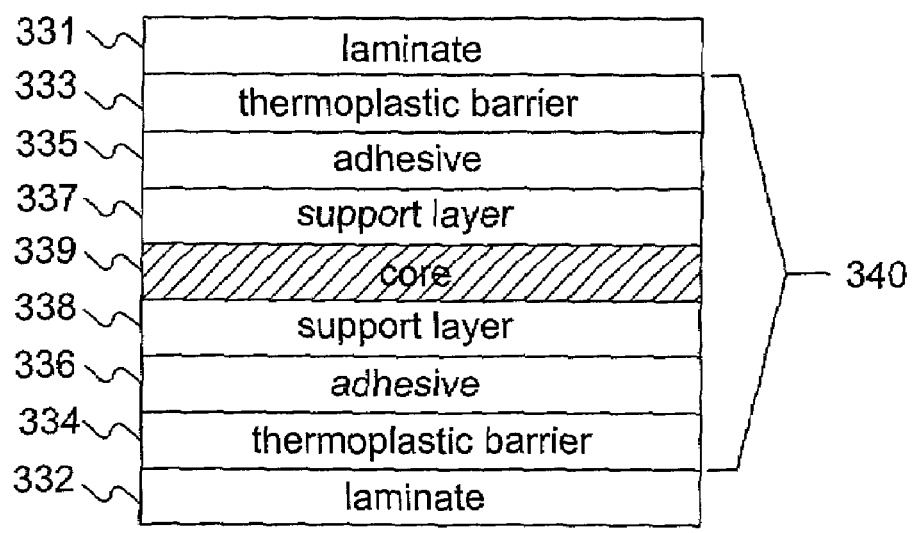
FIG. 3E depicts a material stack comprising a sealed core for manufacturing a molded composite structure consistent with an embodiment of the invention, as shown in FIG. 3D.

FIG. 3E depicts a material stack comprising a sealed core for manufacturing a molded composite structure consistent with an embodiment of the invention, as shown in FIG. 3D. As shown in FIG. 3E, in one implementation, material stack 330 comprises core 339, sealed by thermoplastic barriers 333 and 334 and including support layers 337 and 338 and adhesives 335 and 336 to form sealed core 340. Laminates 318 and 319 surround sealed core 340. This implementation is merely exemplary, and other implementations and materials may also be used.

In one implementation, sealed core 340 is sealed as shown in FIG. 3E (and described in FIG. 3D). Laminates 331 and 332 form the outer layers of material stack 330. In this implementation, the same number of layers of laminate 331 and 332 are used on either side of sealed core 340 (e.g., one layer on each side). However, in other implementations, the number of layers of laminate 331 and 332 on one side of sealed core 340 need not be the same as the number of layers as on the other side of sealed core 340 (i.e., one side may have more or less layers than the other side). These implementations are merely exemplary, and other implementations may also be used.

In another implementation, the laminate layers are applied with a preferred fiber orientation on either side of the core, resulting in added strength. This allows for the use of less layers of laminate. In turn, this decreases the weight of the material stack. This implementation is merely exemplary, and other implementations may also be used.

Figure 4A:
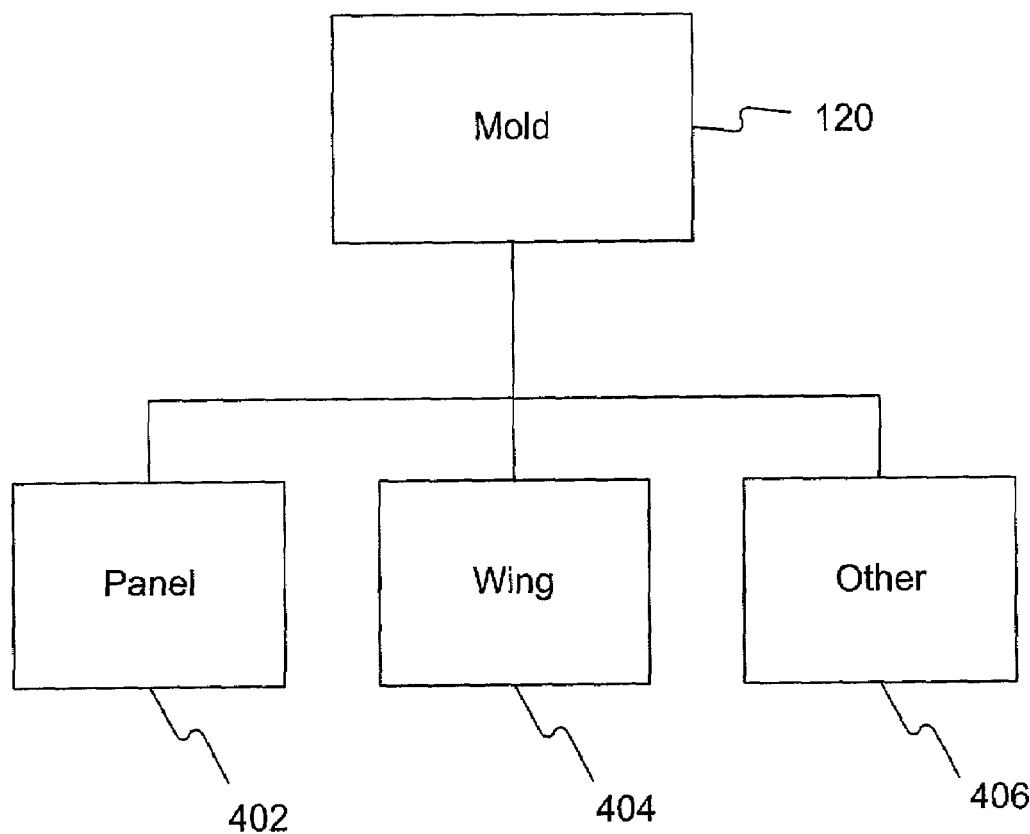
FIG. 4A is a block diagram illustrating structures that can be manufactured from a mold consistent with an embodiment of the invention, as shown in FIG. 1.

FIG. 4A is a block diagram illustrating structures that can be manufactured from a mold consistent with an embodiment of the invention, as shown in FIG. 1. As shown in FIG. 4A, mold 120 may be designed to construct a number of structures, including a panel 402, a wing 404, and other 406.

Panel 402 includes panels for wings and other structures. Wing 404 includes a semi-span wing for an aircraft and a full-span wing for an aircraft. A semi-span wings is a wing for one side of the aircraft, for example, (i.e. a left or right wing). Therefore, two semi-span wings could be constructed. A full-span wing is a one-piece wing for both sides of the aircraft (i.e. a one piece wing comprising both the left and right wing). Other 406 includes any other structures, whether for an aircraft (such as fuselages, ailerons, or flaps) or for other than aircraft (such as automotive, forklift, watercraft, and building structures). In one implementation, the shape of mold 120 determines both the external and internal shape of a molded composite structure 140 such as molded composite structure 140 in FIG. 1. This implementation is merely exemplary, and other implementations may also be used.

Figure 4B:
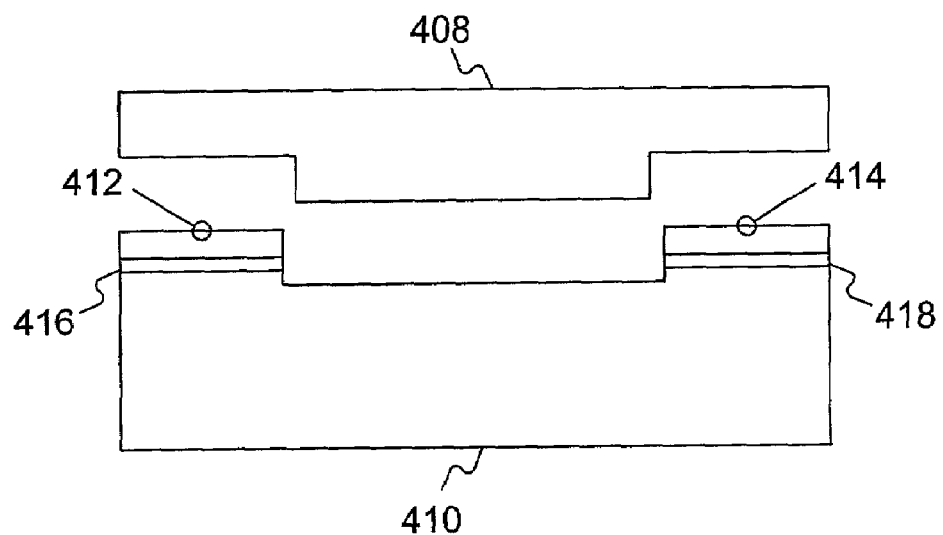
FIG. 4B is an illustrative section view of a mold 400 for manufacturing a molded composite structure consistent with an embodiment of the invention, as shown in FIG. 1.

FIG. 4B is an illustrative section view of a mold 400 for manufacturing a molded composite structure consistent with an embodiment of the invention, as shown in FIG. 1. As shown in FIG. 4B, in one implementation, mold 400 comprises a top outer shell 408 and a bottom outer shell 410. Further, mold 400 comprises O-ring seals 412 and 414 and ports 416 and 418. Mold 400 may also include other elements.

Top outer shell 408 and bottom outer shell 410 may determine the external shape of the structure. For example, the interior shape of top outer shell 408 and bottom outer shell 410 can be designed to form the shape of any of the structures depicted in FIG. 4A. In one implementation, top outer shell 408 and bottom outer shell 410 are clamshell mold halves. In this implementation, mold 400 may also contain internal mold elements (not shown, but described in more detail in FIG. 4C). These internal mold elements may form part of the interior shape of the structure. For example, material 110 (not shown, but described below) may be placed around internal mold elements (not shown, but described below) and within top outer shell 408 and bottom outer shell 410 to form the structure. These implementations are merely exemplary, and other implementations may also be used.

Ports 416 and 418 are openings extending from the exterior of mold 400 to the interior of mold 400. In one implementation, ports 416 and 418 allow for the introduction of a material, such as a resin, into mold 400. In another implementation, at least one of ports 416 and 418 is attached to a vacuum (not shown) for creating a vacuum inside mold 400. Ports 416 and 418 may also be used for other functions. For example, ports 416 and 418 may also be capable of being sealed. These implementations are merely exemplary, and other implementations may also be used.

O-ring seals 412 and 414 allow mold 400 to be sealed upon closure. By being precisely dimensioned, O-ring seals 412 and 414 can prevent significant leaks. In one implementation, O-ring seals 412 and 414 are rubber gaskets. However, other materials could be used for O-ring seals 412 and 414. In addition, multiple O-rings, a single O-ring, concentric O-rings, or other sealing methods may be used.

Figure 4C:
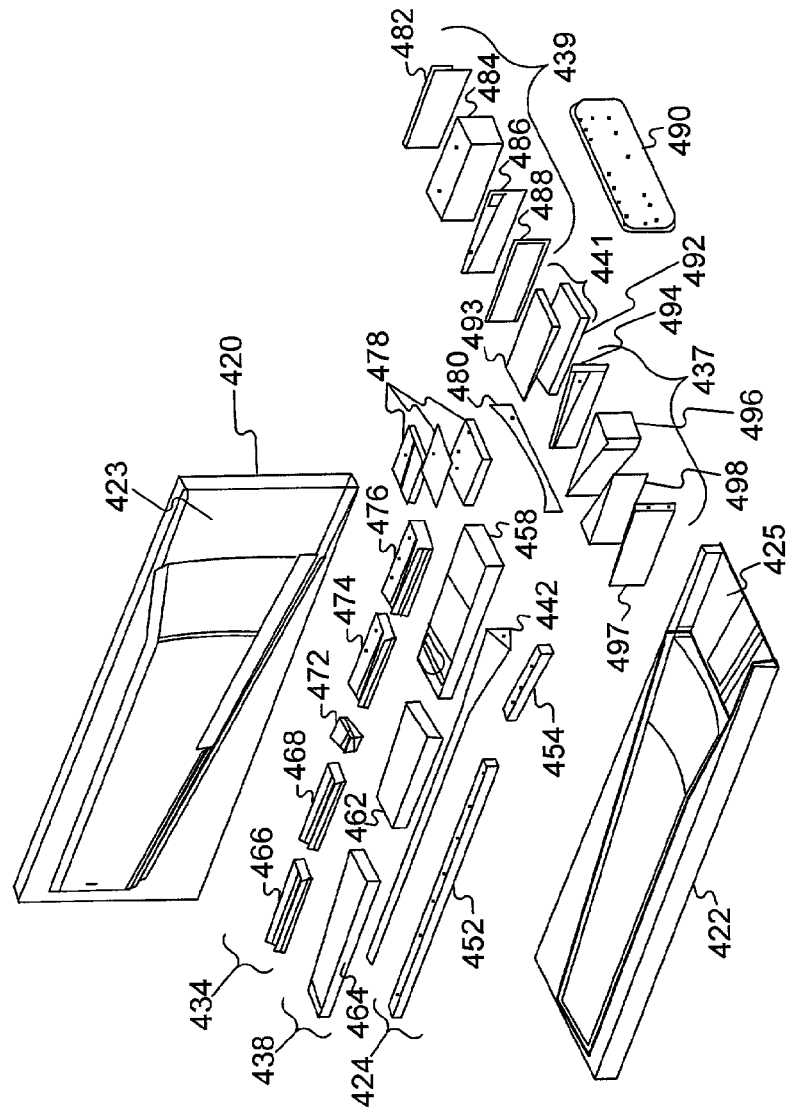
FIG. 4C is a perspective view of mold elements for a wing panel consistent with an embodiment of the invention, as shown in FIG. 4B.

FIG. 4C is a perspective view of mold elements for a wing panel consistent with an embodiment of the invention, as shown in FIG. 4B. As shown in FIG. 4C, in one implementation, mold elements 470 may be used to form a wing panel. Mold elements 470 comprise a top outer shell 420 and a bottom outer shell 422, which form outer mold line ("OML") tooling. Mold elements 470 also include a leading edge mandrel 442, an internal bladder section 438, and a trailing edge section 434, which form internal mold line ("IML") tooling. Mold elements 470 further include a nose-block section 424, a forward cabin area spar forming tooling 437, a middle insert section 441, an aft cabin area spar forming tooling 439, and an end plate 490.

As described above, OML tooling comprises top outer shell 420 and bottom outer shell 422. In one implementation, top outer shell 420 and bottom outer shell 422 form the exterior shape of the wing panel, as described in FIG. 4B.

As described above, the IML tooling comprises leading edge mandrel 442, internal section 438, and trailing edge section 434. In one implementation, leading edge mandrel 442, internal section 438, and trailing edge section 434 form the internal shape of the wing panel as described in FIG. 4B.

Leading edge mandrel 442 forms the interior shape of the leading edge of the wing panel. In one implementation, leading edge mandrel 442 may be constructed of metallic materials such as aluminum, nickel alloys, or Invar, or it may be constructed of non-metallic materials. In this implementation, leading edge mandrel 442 is solid, however, leading edge mandrel 442 may be segmented (as in trailing edge section 434) or may be constructed of bladders (as in internal section 438). In one implementation, following cure of the wing panel (as described below), leading edge mandrel 442 is removed from the structure. These implementations are merely exemplary, and other implementations may also be used.

Internal section 438 forms the internal section of the wing panel. As shown in FIG. 4C, in one implementation, internal section 438 may also comprise an outboard bladder 464, a mid bladder 462, and an inboard bladder 458. However, internal section 438 may comprise any number of bladders or structures. In this implementation, internal section 438 comprises bladders, however, internal section 438 may be solid (as in leading edge mandrel 442) or segmented (as in trailing edge section 434). In one implementation, mid bladder 462 is used to form a fuel tank (not shown). In another implementation, following cure of the wing panel, bladders 458, 462, and 464 are removed from the structure. In yet another implementation, any of bladders 458, 462, and 464 may be left in the structure following cure, and used as a fuel tank. These implementations are merely exemplary, and other implementations may also be used.

Outboard bladder 464 forms an outboard bay interior of the wing panel. Mid bladder 462 forms a mid bay interior of the wing panel. Inboard bladder 458 forms an inboard interior of the wing panel. In one implementation, bladders 458, 462, and 464 are elastomeric tooling. The use of elastomeric tooling allows for the pressure within bladders 458, 462, and 464 to be altered during processing. In one implementation, bladders 458, 462, and 464 are constructed from silicone or polyethelene. These implementations are merely exemplary, and other implementations and other materials may also be used.

Trailing edge section 434 forms the interior shape of the trailing edge of the wing panel. As shown in FIG. 4C, in one implementation, trailing edge section 434 comprises insert sets 466, 468, 472, 474, 476, and 478. In this implementation, following cure of the wing panel, insert sets 466, 468, 472, 474, 476, and 478 are removable from the structure. In this implementation, insert sets 466, 468, 472, 474, 476, and 478 are multiple interlocking hard tool elements, however, trailing edge section 434 may also comprise bladders (as in internal section 438). These implementations are merely exemplary, and other implementations may also be used.

In one implementation, hinge support ribs 460 (not shown) are also included in the spaces between insert sets 466, 468, 472, 474, 476, and 478. Hinge support ribs 460 may provide support for flaps and ailerons on the wing panel.

As described in FIG. 1, material 110 may be placed in mold 120 to form molded composite structure 140. Thus, with reference to FIG. 4C, material 110 may be placed in and around mold elements 470 to form a wing panel. Nose block 424 is used to prevent material 110 from being pinched when top outer shell 420 and a bottom outer shell 422 are closed. In one implementation, noseblock 424 comprises outboard insert 452 and inboard insert 454. In this implementation, insert 452 and insert 454 are designed to mimic the shape of leading edge mandrel 442. Insert 452 may be placed against the long straight portion of leading edge mandrel 442. Insert 454 may be placed against the angled portion of leading edge mandrel 442. In one implementation, inserts 452 and 454 are constructed of aluminum, nickel alloys, or Invar, or they may be constructed of non-metallic materials. These implementations are merely exemplary, and other implementations may also be used.

Figure 4D:
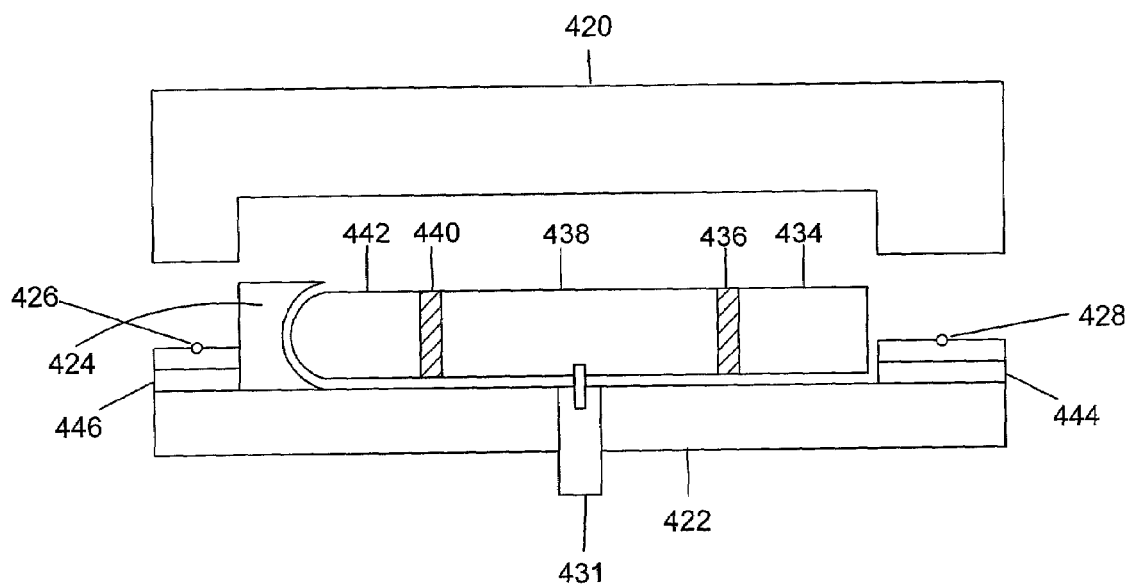
FIG. 4D is an illustrative section view of a mold for a wing panel consistent with an embodiment of the invention, as shown in FIG. 4C.

In another implementation a front spar 440 (not shown, but shown in FIG. 4D) and a rear spar 436 (not shown, but shown in FIG. 4D) provide support for the wing panel and provide for the connection of the wing panel to a fuselage of an aircraft. Front spar 440 is located between leading edge mandrel 442 and internal section 438. Rear spar 436 is located between internal section 438 and trailing edge section 434. Front spar 440 and rear spar 436 may be box beam spars (as shown in FIG. 4D), I-beam spars, C-channel spars, or any other type of spar. These implementations are merely exemplary, and other implementations and other materials may also be used.

In one implementation, spars 436 and 440 are constructed of carbon-fiber. In another implementation, spars 436 and 440 include core materials, such as foam core or honeycomb core. This core may be sealed or unsealed. In another implementation, spars 436 and 440 are cured prior to being used in mold 470. However, spars 436 and 440 may be cured with the part (i.e. wing panel). Spars 436 and 440 may also include a bonding agent on the surface of spars 436 and 440. These implementations are merely exemplary, and other implementations and other materials may also be used.

In one implementation, spars 436 and 440 (not shown, but shown in FIG. 4D) extend beyond the end of the wing panel. This allows spars 436 and 440 to be inserted in a fuselage to connect the wing panel to the rest of an aircraft. In this implementation, mold 422 extends beyond the length of the wing panel. As shown in FIG. 4C, section 423 of top outer shell 420 and section 425 of bottom outer shell 422 extend beyond the length of the wing panel.

Forward cabin area spar forming tooling 437 and aft cabin area spar forming tooling 439 are located in mold section 423. Forward cabin area spar forming tooling 437 and aft cabin area spar forming tooling 439 are used to support the portion of spars 436 and 440 (not shown, but shown in FIG. 4D) extending beyond the wing panel during the curing process. Further, forward cabin area spar forming tooling 437 and aft cabin area spar forming tooling 439 ensure that spars 436 and 440 do not shift during the cure process. This implementation is merely exemplary, and other implementations may also be used.

In one implementation shown in FIG. 4C, forward cabin area spar forming tooling 437 comprises extraction block 497, wedge block 498, lower insert 496, and upper insert 494. In addition, forward cabin area spar forming tooling 437 may comprise other elements. Upper insert 494 and lower insert 496 surround front spar 440 (not shown, but shown in FIG. 4D). Wedge block 498 is inserted to press lower insert 496 against forward spar 440. Extraction block 497 is used to further press wedge block 498 against lower insert 496. These implementations are merely exemplary, and other implementations may also be used.

Aft cabin area sparforming tooling 439 comprises extraction block 482, wedge block 484, lower insert 488, and upper insert 486. In addition, aft cabin area spar forming tooling 439 may comprise other elements. Upper insert 486 and lower insert 488 surround rear spar 436 (not shown, but shown in FIG. 4D). Wedge block 484 is inserted to press upper insert 486 against rear spar 436. Extraction block 482 is used to further press wedge block 484 against upper insert 486. These implementations are merely exemplary, and other implementations may also be used.

Middle insert section 441 comprises mid bay top plate 493, mid bay bottom plate 492, and bottom insert 470. In addition, middle insert section 441 may comprise other elements. Middle insert section 441 holds spars 436 and 440 (not shown, but shown in FIG. 4D) in position during curing. Mid bay top plate 493 and mid bay bottom plate 492 press lower insert 488 further against rear spar 436 and upper insert 494 further against forward spar 440. Bottom insert 470 further supports spars 436 and 440. These implementations are merely exemplary, and other implementations may also be used.

In one implementation, the components of forward cabin area spar forming tooling 437, aft cabin area spar forming tooling 439, and middle insert section 441 are constructed of aluminum, nickel alloys, or Invar, or they may be constructed of non-metallic materials. These implementations are merely exemplary, and other implementations and other materials may also be used.

End plate 490 may be used to complete closure of mold elements 470. In one implementation, end plate 490 seals mold elements 470 such that a vacuum may be created inside of mold elements 470. In one implementation, end plate 490 is constructed of aluminum, nickel alloys, or Invar, or it may be constructed of non-metallic materials. These implementations are merely exemplary, and other implementations and other materials may also be used.

As described above, in one implementation, mold elements 470 may undergo curing along with the wing panel. In this regard, the coefficient of expansion of mold elements 470 may be different from each other or of the wing panel. Thus, during curing, mold elements 470 and the wing panel may expand more or less than one another. Therefore, in one implementation, each of the elements of mold elements 470 may be designed to prevent expansion or contraction of the elements from damaging the wing panel or mold elements during curing and subsequent cool down. This implementation is merely exemplary, and other implementations may also be used.

FIG. 4D is an illustrative section view of a mold for a wing panel consistent with an embodiment of the invention, as shown in FIG. 4C. As shown in FIG. 4D, top outer shell 420 and bottom outer shell 422 form the OML tooling as described in FIG. 4C. FIG. 4D also shows the IML tooling described in FIG. 4C, including leading edge mandrel 442, internal bladder section 438, and trailing edge section 434. The IML tooling is located inside the OML tooling. In addition, FIG. 4D shows front spar 440 positioned between leading edge mandrel 442 and internal bladder section 438 and rear spar 436 positioned between internal bladder section 438 and trailing edge section 434. In one implementation, material (not shown, but described herein) is applied around the exterior of the IML tooling and the spars to form the wing panel. This implementation is merely exemplary, and other implementations may also be used.

FIG. 4D also shows noseblock section 424 as described in FIG. 4C. As discussed above, noseblock section 424 is located next to leading edge mandrel 442. In one implementation, mold 470 also includes an integral tooling port 431. Port 431 runs from the exterior of mold 470 to internal bladder section 438. In one implementation, a pressure controlling device (not shown) is connected to port 431 to alter the pressure within internal bladder section 438. As described in FIG. 4C, internal section 438 may comprise outboard bladder 464, mid bladder 462, and inboard bladder 458.

In one implementation, all three bladders may be connected collectively to port 431. In another implementation, all three bladders may be connected separately to port 431. Alternatively, in still another implementation, inboard bladder 458 and mid bladder 462 are connected in series to one another. In this implementation, only outboard bladder 464 and inboard bladder 458 would be connected to port 431. In yet another implementation, port 431 would comprise multiple ports. In this implementation, each bladder may have a corresponding port. Thus, any combination of bladder connections and ports may be used to allow for control of the pressure within the bladders. These implementations are merely exemplary, and other implementations may also be used.

As shown in FIG. 4D, mold 470 also comprises ports 444 and 446. Ports 444 and 446 are similar to ports 416 and 418, as described in FIG. 4B. In one implementation, ports 444 and 446 are used to introduce material such as resin into mold 470. In another implementation, ports 444 and 446 allow for the creation of a vacuum inside mold 470. Mold 470 also contains O-ring seals 426 and 428, which are similar to O-ring seals 418 and 418 described in FIG. 4B. In one implementation, O-ring seals 426 and 428 allow the mold to be sealed. As described above, O-ring seals 426 and 428 may constitute concentric O-rings or other sealing methods. This implementation is merely exemplary, and other implementations may also be used.

In another implementation, the geometry of the tooling is designed to prevent fiber washout during resin infusion. As described above, material stacks are applied around the IML tooling and the spars. In one implementation, the material stacks have a specific fiber orientation. As described above, this fiber orientation provides for greater material strength. During the infusion of resin into the mold, the force of the resin against the fiber may cause the fibers to shift and thus alter the orientation. This may decrease the strength of the material. However, the tooling elements may be designed to prevent this fiber washout through precise geometric controls. For example, by designing the tool to precisely align with the internal mold elements and the fibers, the shifting of the fibers from resin infusion is reduced. This implementation is merely exemplary, and other implementations may also be used.

Figure 4E:
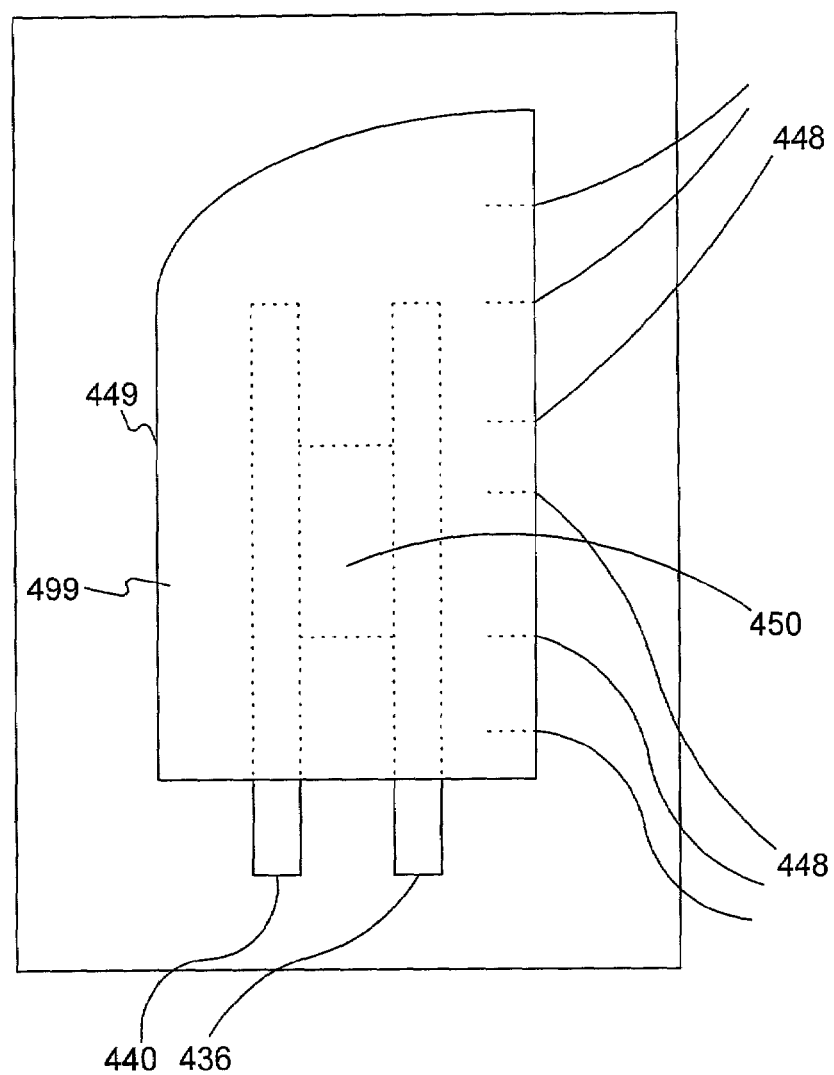
FIG. 4E is a plan view of a wing panel in a mold consistent with an embodiment of the invention, as shown in FIG. 4D.

FIG. 4E is a plan view of a wing panel in a mold consistent with an embodiment of the invention, as shown in FIG. 4D. As shown in FIG. 4E, mold 470 is used to form a wing panel 449. Wing panel 449 comprises skin 499, co-cured spars 440 and 436, a co-cured fuel tank 450, and co-cured hinge support ribs 448. In one implementation, skin 499 is a cured material stack as described in FIGS. 3A-3E. In one implementation, co-cured spars 440 and 436 may be loaded in the IML tooling as described in FIGS. 4C and 4D. In one implementation, co-cured fuel tank 450 may be formed in wing panel 449 as described in FIG. 4C. Piping (not shown) connects fuel tank 450 to the engine (not shown) of an aircraft to provide fuel to the engine. In one implementation, co-cured hinge supports 448 may be formed in the trailing edge of the wing, as described in FIG. 4C. In one implementation, the OML tooling shown in FIG. 4D is 244 inches long and 70 inches wide at its widest point. In another implementation, these elements are either co-cured, co-bonded, and/or cured separately from one another. These implementations are merely exemplary, and other implementations may also be used.

Figure 5:
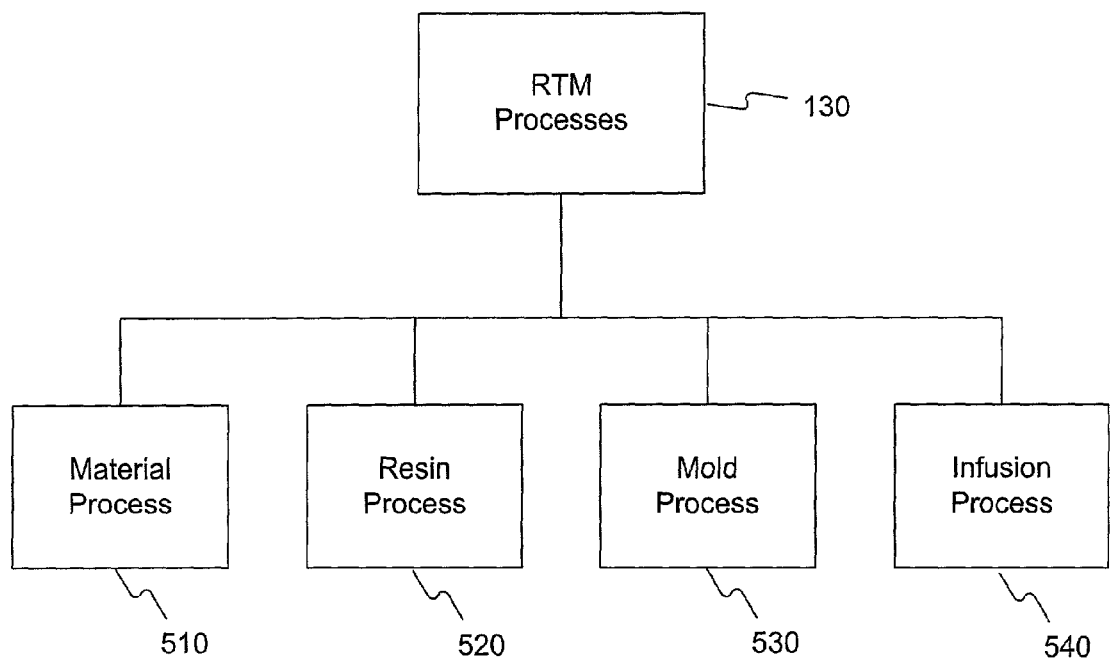
FIG. 5 is a block diagram illustrating components of resin transfer molding for manufacturing a molded composite structure consistent with an embodiment of the invention, as shown in FIG. 1.

FIG. 5 is a block diagram illustrating components of resin transfer molding for manufacturing a molded composite structure consistent with an embodiment of the invention, as shown in FIG. 1. As shown in FIG. 5, RTM process 130 comprises a material process 510, a resin process 520, a mold process 530, and an infusion process 540. Material process 510 includes the preparation of material stacks as described in FIGS. 2A-3D. Material process 510 is further described in FIGS. 6A-6B. Resin process 520 includes the preparation of a resin to be infused into a material stack. Resin process 520 is further described in FIG. 7. Mold process 530 includes the preparation of a mold as described in FIGS. 4A-4E. Mold process 530 also includes the placement of a material stack in the mold. Mold process 530 is further described in FIGS. 8A-9E. Infusion process 540 includes the infusion of resin into the mold and the curing of the resin and material to form a structure. Infusion process 540 is further described in FIGS. 10A-11I. This implementation is merely exemplary, and other implementations may also be used.

Figure 6A:
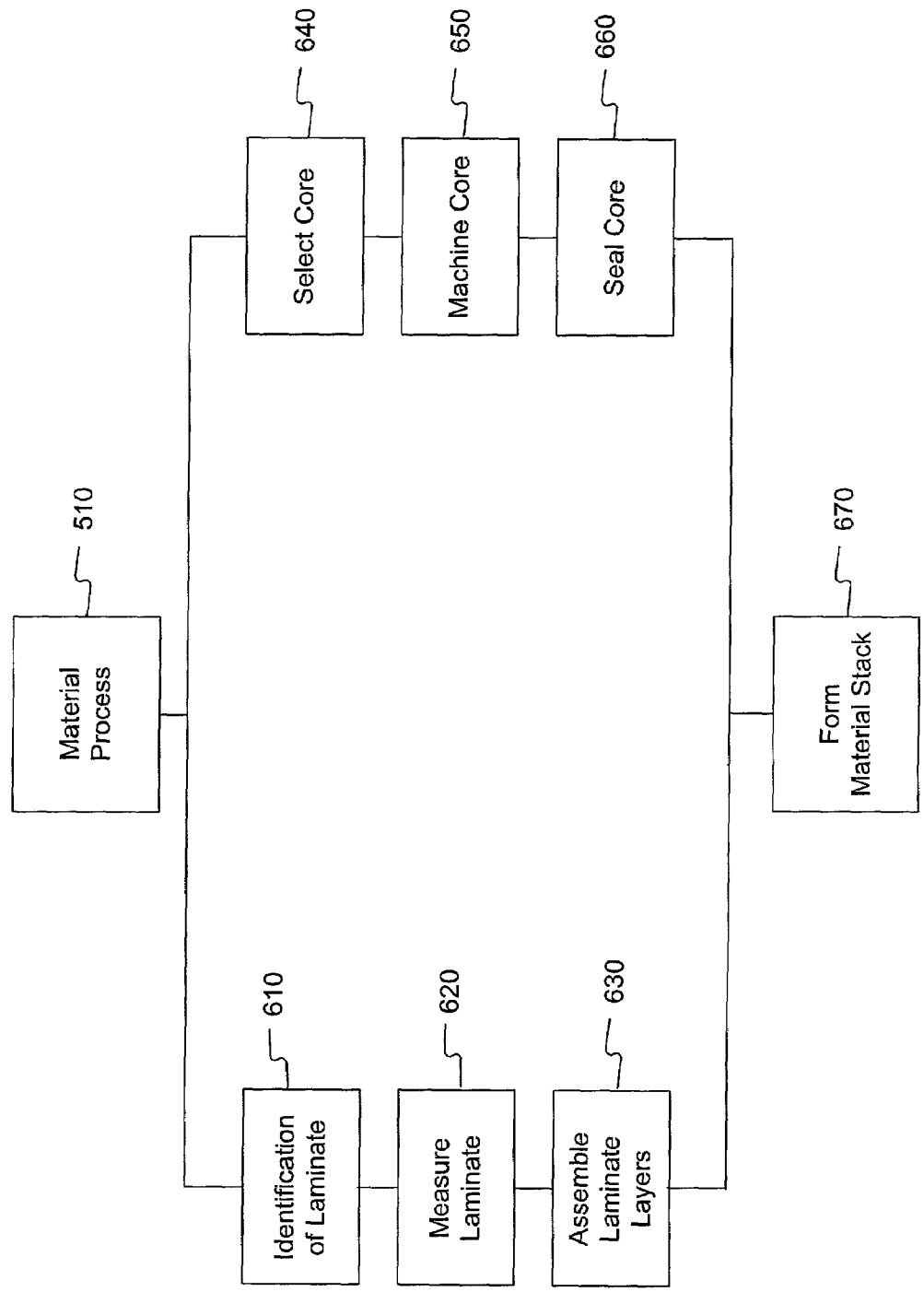
FIG. 6A is a block diagram illustrating components for a material process for manufacturing a molded composite structure in accordance with one embodiment of the invention, as shown in FIG. 5.

FIG. 6A is a block diagram illustrating components for a material process for manufacturing a molded composite structure in accordance with one embodiment of the invention, as shown in FIG. 5. As shown in FIG. 6A, material process 510 includes identification of laminate 610. In one implementation, identification of laminate 610 includes the selection of any of the laminates described in FIG. 2B. Next, identification of laminate 610 is followed by measure laminate 620. In one implementation, measure laminate 620 includes the determination of the amount of laminate to be used to make up each layer of laminate. This can be determined based on the total desired weight of the laminate layer or the number of plies of laminate to be used. Measure laminate 620 is followed by assemble laminate layers 630. In one implementation, assemble laminate layers 630 includes the assembly of at least two laminate layers.

Material process 510 also includes select core 640. Select core 640 includes the selection of core material to be used. In one implementation, core is any of those materials described in FIG. 2C. However, other materials may be used.

Select core 640 is followed by machine core 650. Machine core 650 includes trimming, cutting, shaping, and preparing the core material into a desired shape for placement in a material stack.

Machine core 650 is followed by seal core 660. In one implementation, seal core 660 includes the sealing of the core on both sides. In another implementation, as described in FIG. 3D, a support layer is placed on both sides of the core, an adhesive layer is placed on both sides of the core, and a thermoplastic barrier layer is placed on both sides of the core to seal the core. As described above, the adhesive may be located on the thermoplastic barriers, the core, or both. In another implementation, the core would be cured to seal the thermoplastic barrier layers around the core. This cure process may be performed prior to formation of the material stack, following material stack formation but prior to placement of the material stack in a mold, or during cure of the wing panel. These implementations are merely exemplary, and other implementations may also be used.

Seal core 660 is followed by form material stack 670. In one implementation, form material stack 670 includes placing laminate layers on either side of the sealed core to form a material stack. In this implementation, material process 510 creates a material stack as described in FIG. 3D. As further described in FIG. 3D, in another implementation, either the same or a differing number of laminate layers can be placed on either side of the core.

In another implementation, laminate layers are applied with the same fiber orientation on either side of the core. Proper alignment of the fibers can result in added strength. This allows for the use of less layers of laminate. In turn, this decreases the weight of the material stack. This implementation is merely exemplary, and other implementations may also be used.

Figure 6B:
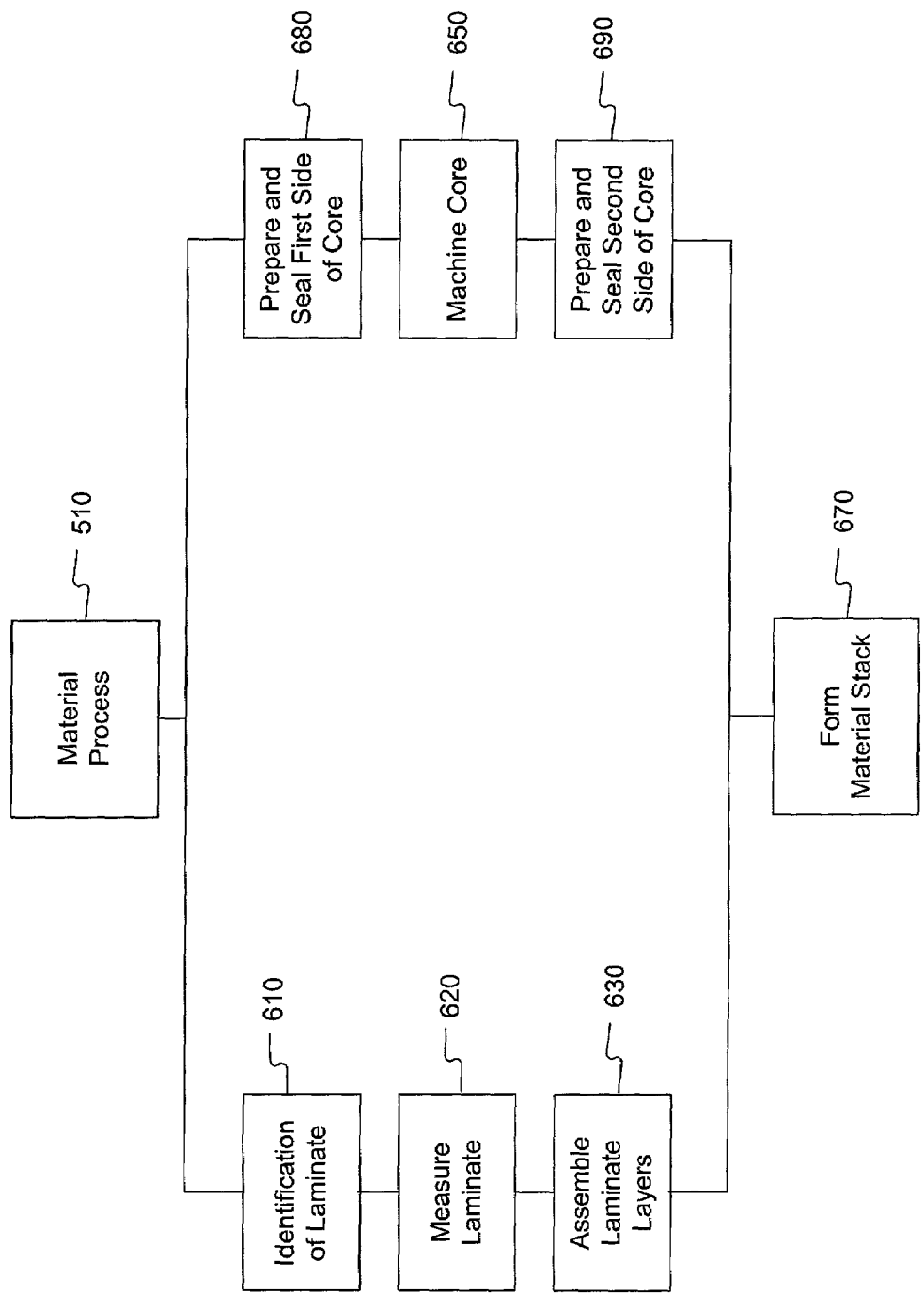
FIG. 6B is a block diagram illustrating the components for a material process for manufacturing a molded composite structure in accordance with another embodiment of the invention, as shown in FIG. 5.

FIG. 6B is a block diagram illustrating the components for a material process for manufacturing a molded composite structure in accordance with another embodiment of the invention, as shown in FIG. 5. As shown in FIG. 6B, similar to FIG. 6A, prepare material 510 includes identification of laminate 610, measure laminate 620, and assemble laminate layers 630.

Material process 510 also includes prepare and seal first side of core 680 occurs. Prepare and seal first side of core 680 includes the selection of the core to be used. In one implementation, core can be any of the materials described in FIG. 2C. Prepare and seal first side of core 680 also includes the sealing of one side of the core. In one implementation, a support layer is placed on one side of the core and an adhesive layer is placed on top of that support layer. In this implementation, a thermoplastic barrier layer is then placed on top of the adhesive layer. The thermoplastic barrier layer may then be cured to complete the seal. This implementation is merely exemplary, and other implementations may also be used.

Prepare and seal first side of core 680 is followed by machine core 650. As in FIG. 6A, machine core 650 includes trimming of the core into a desired shape for placement in the material stack. However, in this implementation, the core is trimmed after it has been sealed on one side. Sealing one side of the core stabilizes the core. By stabilizing the core prior to machining more detailed cutting and machining processes may be performed on the core. For example, planning and certain router operations may now be performed on the partially sealed core. This implementation is merely exemplary, and other implementations may also be used.

Machine core 650 is followed by prepare and seal second side of core 690. In one implementation, prepare and seal second side of core 690 includes sealing the remaining side of the core in the same manner that the first side was sealed. This implementation is merely exemplary, and other implementations may also be used.

Prepare and seal second side of core 690 is followed by form material stack 670. As in FIG. 6A, in one implementation, form material stack 670 includes the placement of the laminate layers on either side of the sealed core to form the material stack. In this implementation, there are even laminate layers. As described above, material stack 670 may also include material stacks with uneven laminate layers.

FIGS. 6A-6B have described material process 510, as shown in FIG. 5. As shown in FIG. 5, material process 510 is followed by resin process 520. Resin process 520 is described in FIG. 7.

Figure 7:
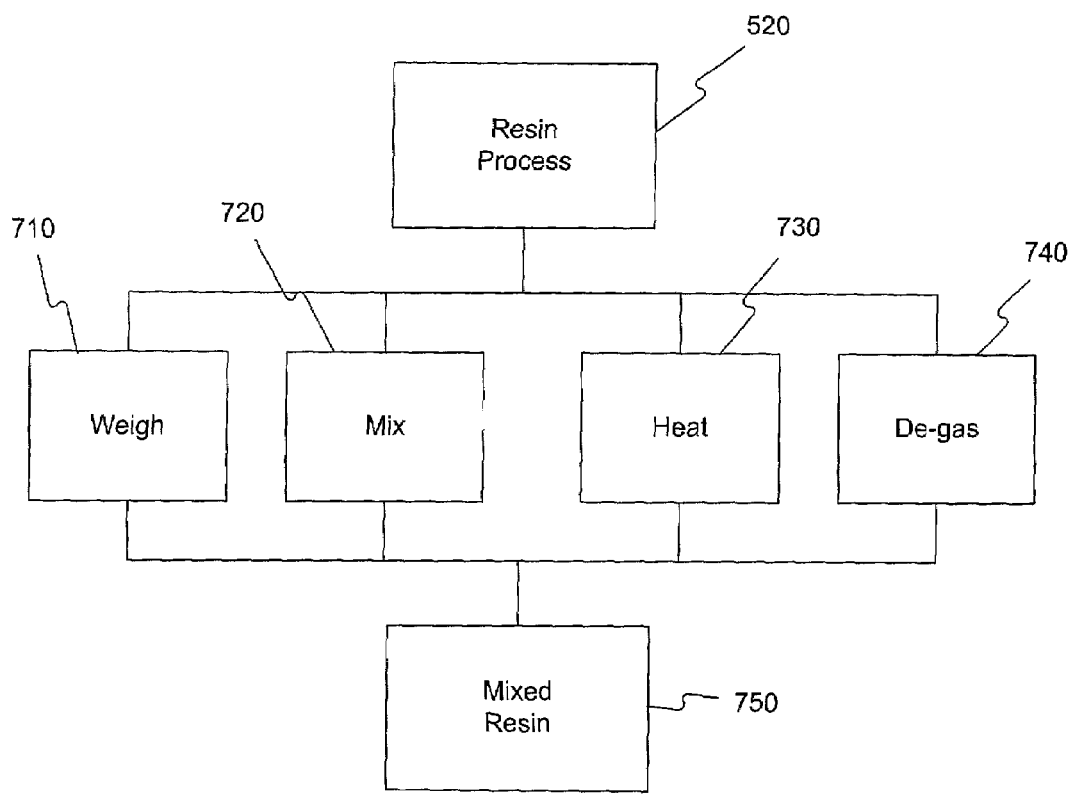
FIG. 7 is a block diagram illustrating components for a resin process for manufacturing a molded composite structure in accordance with one embodiment of the invention, as shown in FIG. 5.

FIG. 7 is a block diagram illustrating components for a resin process for manufacturing a molded composite structure in accordance with one embodiment of the invention, as shown in FIG. 5. As shown in FIG. 7, resin process 520 includes weigh 710, mix 720, heat 730, and de-gas 740. Resin process 520 then results in mixed resin 750.

The preparation of the resin in resin process 520 begins with weigh 710. Weigh 710 includes the selection of the various components to make up the resin. In one implementation, materials are selected based on their ability to affect certain properties of the resin, such as viscosity, strength, toughness, and gel cycle time. In this implementation, following the selection of the materials, a determination of the amount of each material to include is made. This determination is made by weighing the material. This implementation is merely exemplary, and other implementations may also be used.

Weigh 710 is followed by mix 720. Mix 720 includes mixing of the materials chosen in the weigh 710. Following mix 720 is heat 730. Heat 730 includes applying heat to the mixture to raise the temperature of the mixture. Following heat 730 is de-gas 740. De-gas 740 includes de-gassing of the resin after raising the temperature of the resin to remove dissolved gasses or solvents from mixed resin. In one implementation, de-gassing is achieved by placing the material in a low-pressure environment. As the pressure decreases, trapped gasses will boil to the surface of the material. The pressure at which the materials are de-gassed should be at least as low as the pressure used in the resin transfer molding process. Otherwise, further de-gassing may occur during the resin transfer molding process causing voids in the structure. These implementations are merely exemplary, and other implementations may also be used.

In another implementation, prior to mix 720, the materials are separately heated and de-gassed. In yet another implementation, no heat is applied at any point. These implementations are merely exemplary, and other implementations may also be used.

In one implementation, weigh 710, mix 720, heat 730, and de-gas 740 may be prepared specifically for the structure. For example, resins V42, V43, SC32 from Applied Polymeric may be used. In another implementation, instead of the use of a custom prepared resin, an off-the-shelf resin may also be used. These implementations are merely exemplary, and other implementations may also be used.

FIG. 7 has described resin process 520, as shown in FIG. 5. As shown in FIG. 5, following resin process 520 is mold process 530. Mold process 530 is described in FIGS. 8A-9E.

Figure 8A:
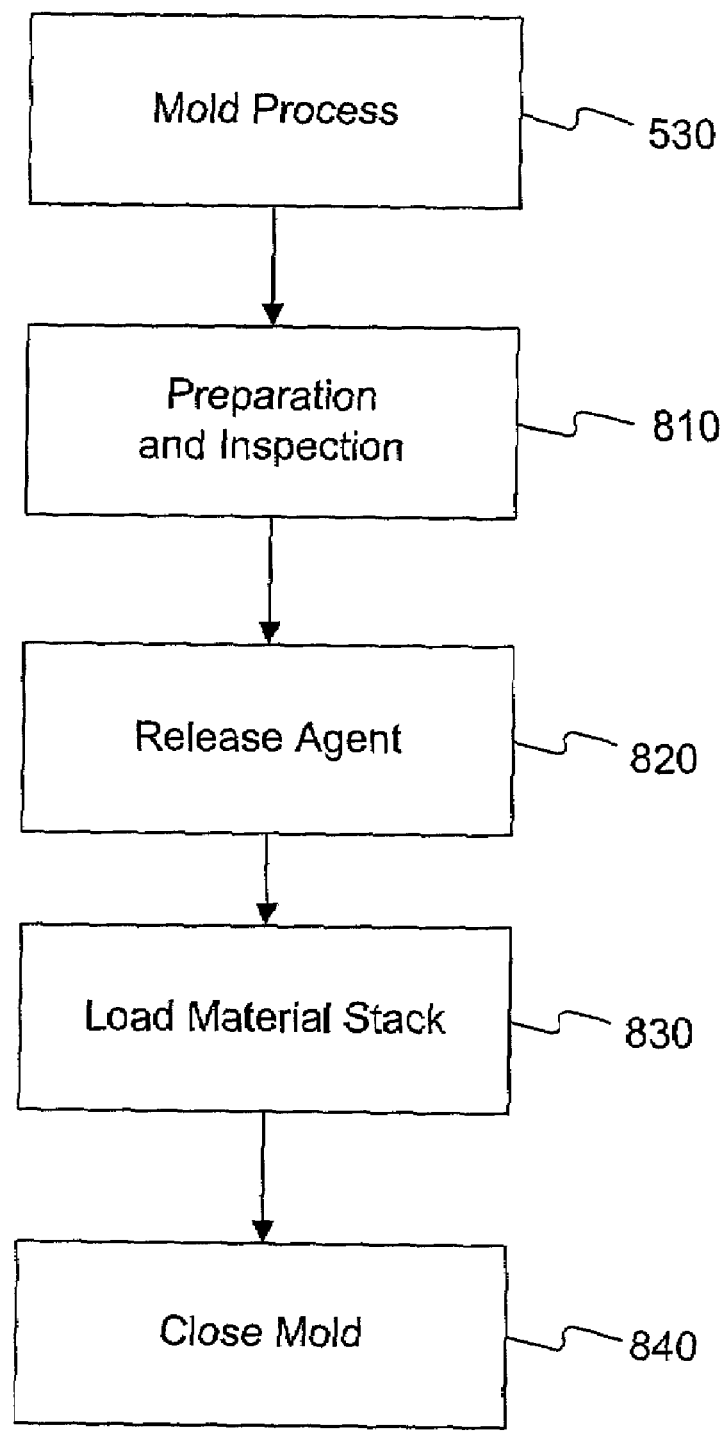
FIG. 8A is a block diagram illustrating a mold process for manufacturing a molded composite structure in accordance with one embodiment of the invention, as shown in FIG. 5.

FIG. 8A is a block diagram illustrating a mold process for manufacturing a molded composite structure in accordance with one embodiment of the invention, as shown in FIG. 5. As shown in FIG. 8A, mold process 530 begins with preparation and inspection 810. Preparation and inspection 810 includes the preparation of the mold elements as described in FIGS. 4A-4E. It also includes the inspection and fit checking of the mold elements to determine that the mold will form the desired shape. Preparation and inspection 810 is further described in FIG. 9A.

Preparation and inspection 810 is followed by release agent 820. Release agent 820 includes application of a release agent to the mold elements. This prevents the mold elements from adhering to the formed structure, such as a wing panel, and from adhering to other mold elements. Release agent 820 is further described in FIG. 9B.

Release agent 820 is followed by load material stack 830. Load material stack 830 includes the placing of material in the mold. In one implementation, material is created using material process 510 as described in FIGS. 6A-6B. In one implementation, material includes a material stack comprising a sealed core, a material stack comprising laminate layers, a material stack comprising a sealed core and laminate layers, a material stack comprising an unsealed core and laminate layers, or a material stack comprising a partially sealed core and laminate layers. As described above, the number of laminate layers may be the same or different on either side of the core. In addition, as described above, the laminate layers may be applied so that the orientation of the fibers provides for greater strength. These implementations are merely exemplary, and other implementations may also be used.

A material stack comprising only laminate layers may be used in leading edge sections, integrating rib sections, and integrating spar sections where core material may not be required. A material stack comprising a sealed core and laminate layers may be used in integrating rib sections and integrating spar skin sections where core may be needed. A material stack comprising an unsealed core sandwiched by laminate layers may also be used. The core will then be sealed during the cure of the part. Load material stack 830 is further described in FIGS. 9C-9D.

Load material stack 830 is followed by close mold 840. Close mold 840 includes the closing of the mold around the material. Close mold 840 is further described in FIG. 9E.

Figure 8B:
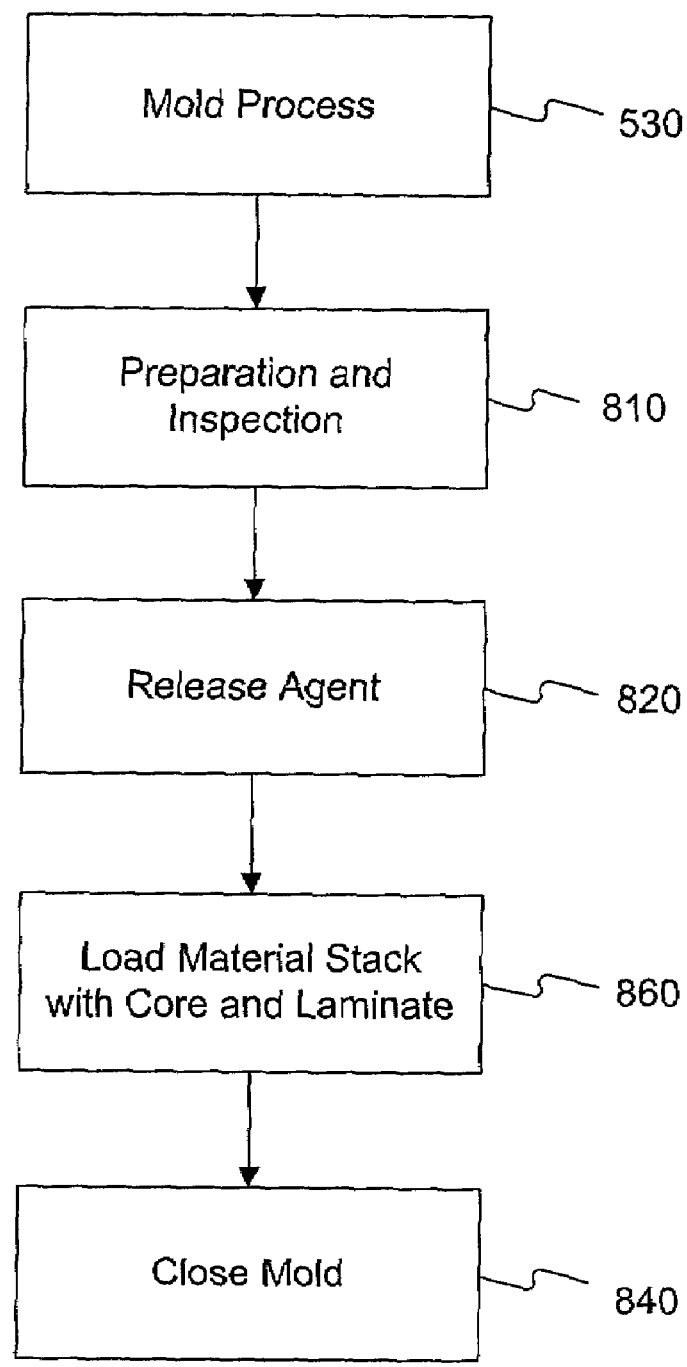
FIG. 8B is a block diagram illustrating a mold process for manufacturing a molded composite structure in accordance with another embodiment of the invention, as shown in FIG. 5.

FIG. 8B is a block diagram illustrating a mold process for manufacturing a molded composite structure in accordance with another embodiment of the invention, as shown in FIG. 5. As shown in FIG. 8B, this embodiment is identical to that described in FIG. 8A, except that load material stack 830 from FIG. 8A has been replaced with load material stack with core and laminate 860 in FIG. 8B. Load material stack with core and laminate 860 includes the loading of a material stack comprising a core sandwiched by two laminate layers. In one implementation, the core is either sealed or unsealed. In another implementation, the laminate layers may be identical in weight or ply count, but they are not required to be so. Load material stack with core and laminate 860 is further described in FIGS. 9C-9D. These implementations are merely exemplary, and other implementations may also be used.

Figure 8C:
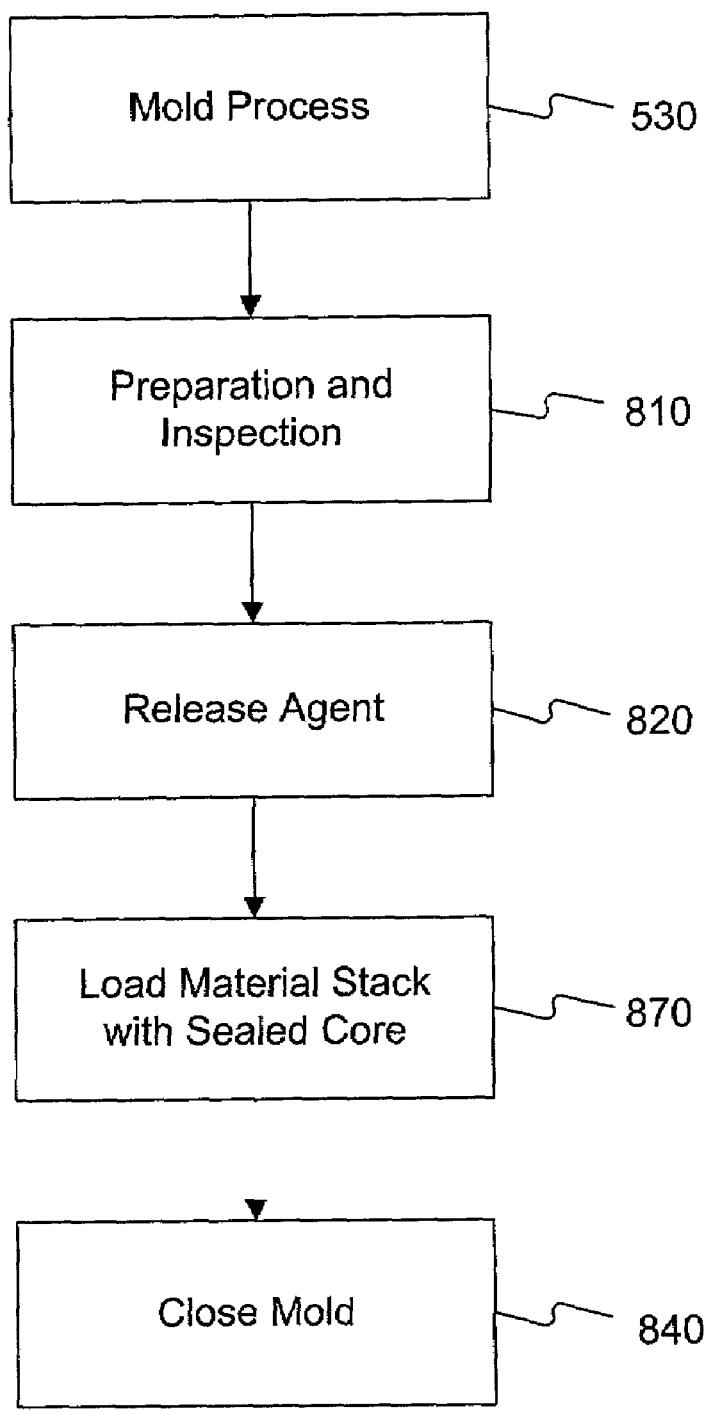
FIG. 8C is a block diagram illustrating a mold process for manufacturing a molded composite structure in accordance with still another embodiment of the invention, as shown in FIG. 5.

FIG. 8C is a block diagram illustrating a mold process for manufacturing a molded composite structure in accordance with still another embodiment of the invention, as shown in FIG. 5. As shown in FIG. 8C, this embodiment is also identical to that described in FIG. 8A, except load material stack 830 has been replaced with load material stack with sealed core 870. Load material stack with sealed core 870 includes placing of a sealed core material stack in the mold. In one implementation, the sealed core also includes one or more laminate layers as described in FIGS. 6A-6B. However, in other implementations, the core need not be sandwiched by laminate layers. Load material stack with sealed core 870 is further described in FIGS. 9C-9D. These implementations are merely exemplary, and other implementations may also be used.

Figure 8D:
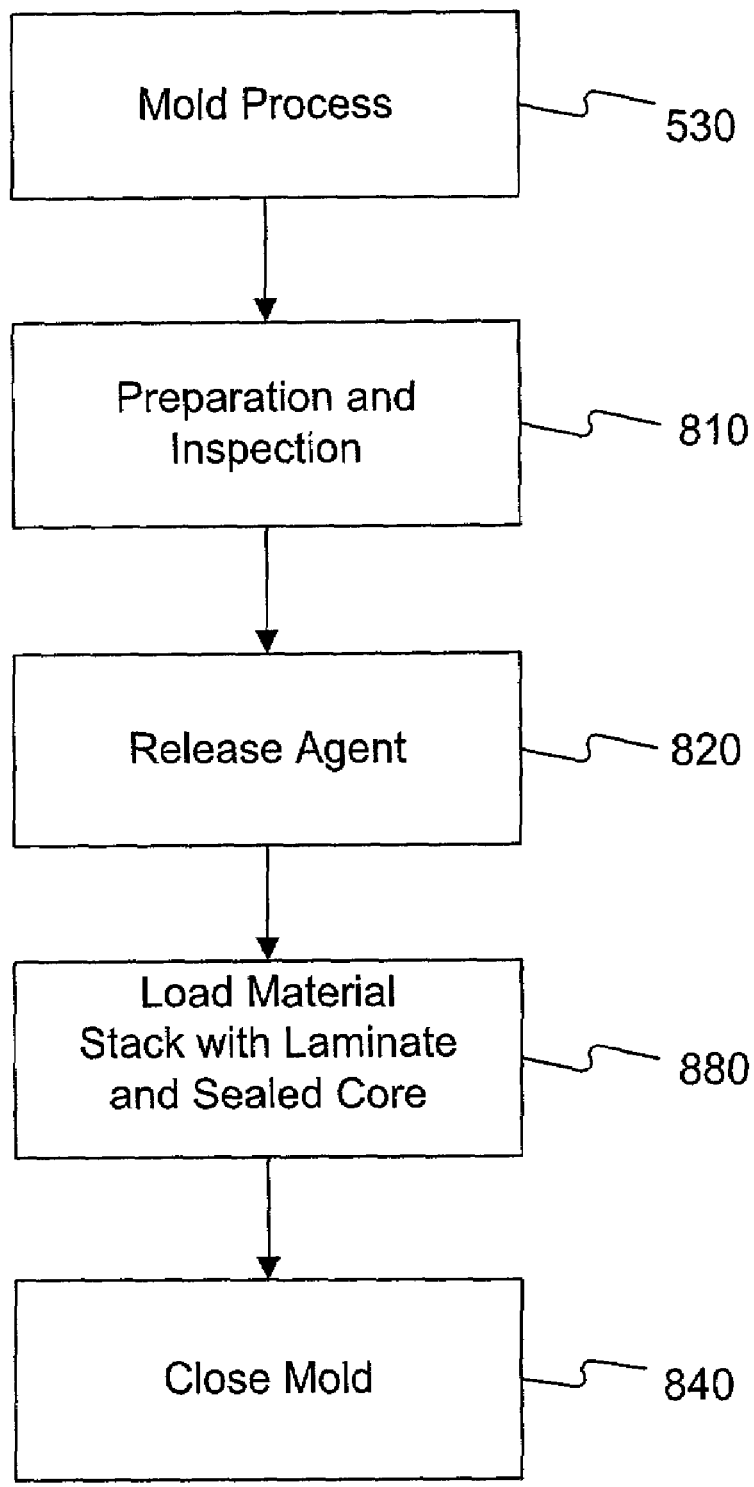
FIG. 8D is a block diagram illustrating a mold process for manufacturing a molded composite structure in accordance with yet another embodiment of the invention, as shown in FIG. 5.

FIG. 8D is a block diagram illustrating a mold process for manufacturing a molded composite structure in accordance with yet another embodiment of the invention, as shown in FIG. 5. As shown in FIG. 8D, this embodiment is also identical to that described in FIG. 8A except load material stack 830 has been replaced with load material stack with laminate and sealed core 880. Load material stack with laminate and sealed core 880 includes the placing a material stack containing a sealed core sandwiched between laminate layers in the mold. In one implementation, the material stack is that described in FIG. 3D. However, other material stacks may be used. Load material stack with laminate and sealed core 880 is further described in FIGS. 9C-9D. These implementations are merely exemplary, and other implementations may also be used.

Figure 8E:
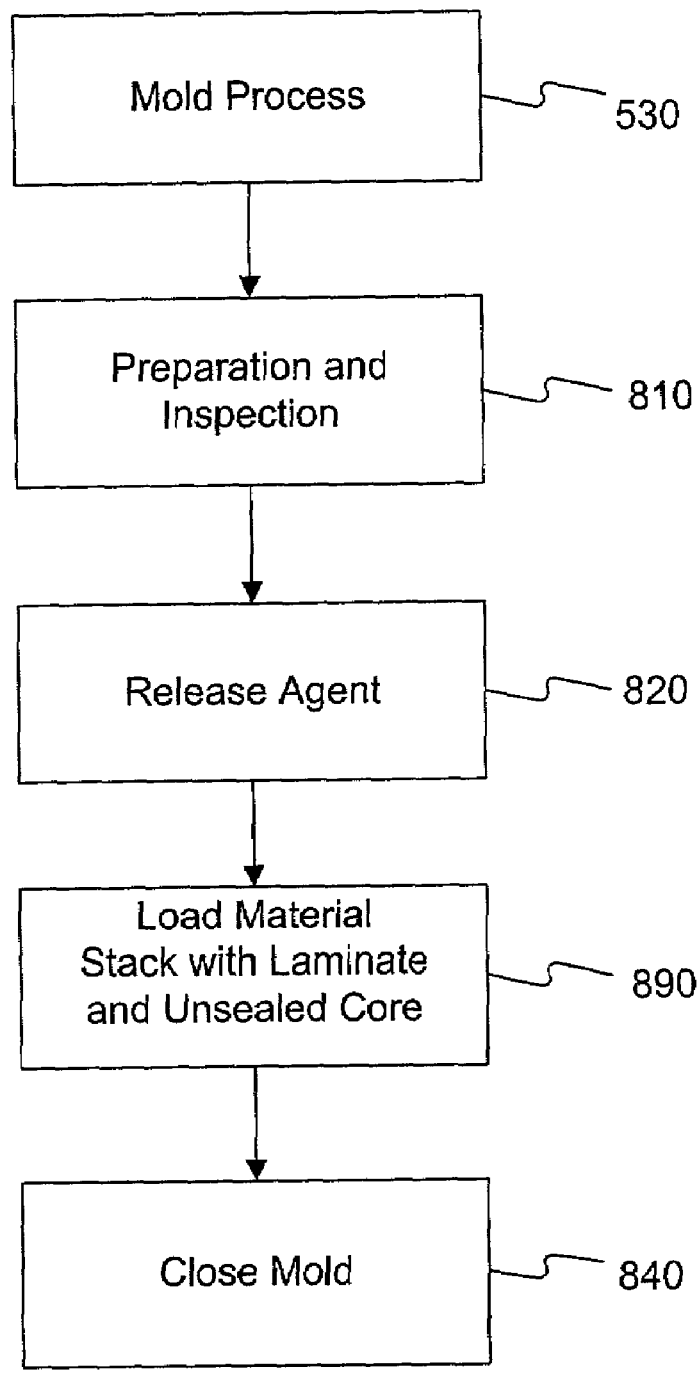
FIG. 8E is a block diagram illustrating a mold process for manufacturing a molded composite structure in accordance with yet another embodiment of the invention, as shown in FIG. 5.

FIG. 8E is a block diagram illustrating a mold process for manufacturing a molded composite structure in accordance with yet another embodiment of the invention, as shown in FIG. 5. As shown in FIG. 8E, this embodiment is also identical to that described in FIG. 8A except load material stack 830 has been replaced with load material stack with laminate and unsealed core 890. Load material stack with laminate and unsealed core 890 includes the placing a material stack containing an unsealed core sandwiched between laminate layers in the mold. In one implementation, the core is sealed during the cure of the wing panel. Load material stack with laminate and sealed core 880 is further described in FIGS. 9C-9D. These implementations are merely exemplary, and other implementations may also be used.

As shown in FIG. 8A, preparation and inspection 810 is the first step in mold process 530. Preparation and inspection 810 is described in FIG. 9A.

Figure 9A:
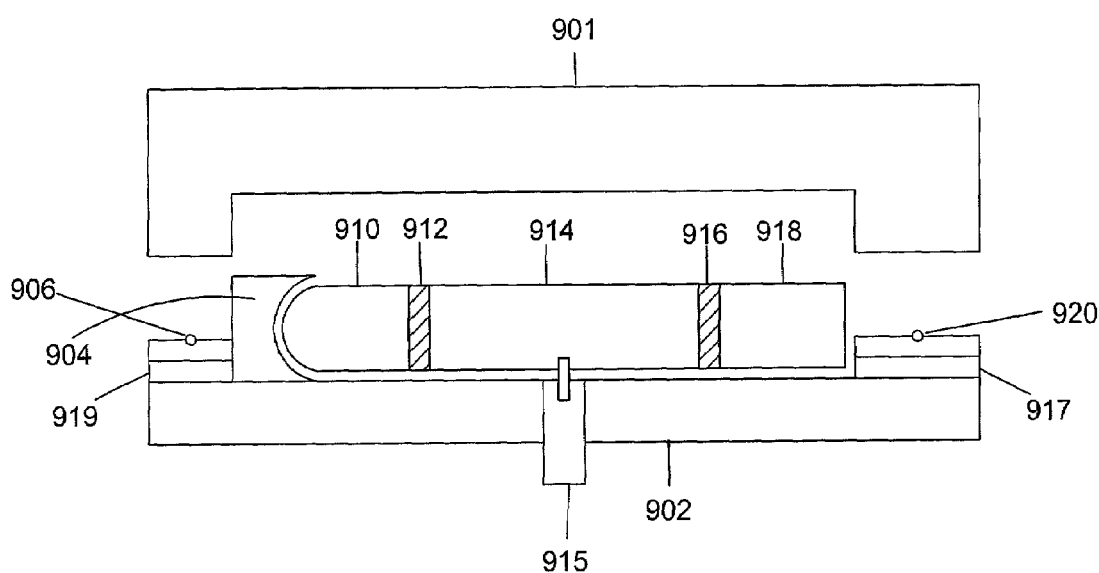
FIG. 9A is an illustrative section view of a mold for a wing panel prepared and inspected consistent with an embodiment of the invention, as shown in FIGS. 8A-8D.

FIG. 9A is an illustrative section view of a mold for a wing panel prepared and inspected consistent with an embodiment of the invention, as shown in FIGS. 8A-8D. As shown in FIG. 9A, mold 900 includes a top clam shell half 901 and a bottom clamshell half 902 to form the OML tooling element as described in FIGS. 4A-4E. Mold 900 also includes a leading edge mandrel 910, an internal bladder section 914, and a trailing edge section 918, which form the IML tooling element as described in FIGS. 4A-4E. In addition, mold 900 includes a front spar 912 and a rear spar 916. As further described in FIGS. 4A-4E, mold 900 also includes a noseblock section 904, O-rings 906 and 920, an internal bladder port 915, and two ports 919 and 917. In one implementation of preparation and inspection 810, these elements are all inspected and checked to ensure that the mold will form the desired shape and that it will close properly. This implementation is merely exemplary, and other implementations may also be used.

FIG. 9A describes preparation and inspection 810, as shown in FIG. 8A. As shown in FIG. 8A, following preparation and inspection 810 is release agent 820. Release agent 820 is described in FIG. 9B.

Figure 9B:
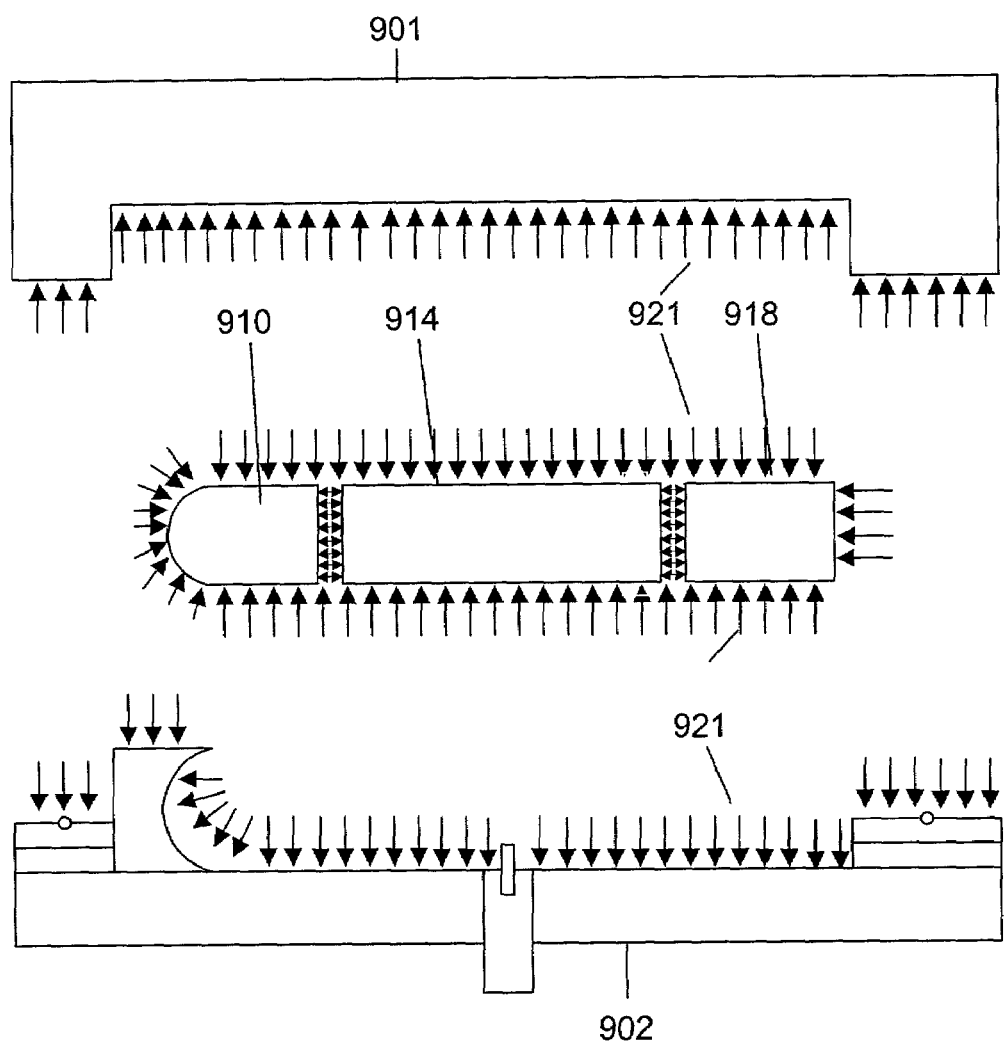
FIG. 9B is an illustrative section view of a mold for a wing panel with release agent consistent with an embodiment of the invention, as shown in FIGS. 8A-8D.

FIG. 9B is an illustrative section view of a mold for a wing panel with release agent consistent with an embodiment of the invention, as shown in FIGS. 8A-8D. As shown in FIG. 9B, release agent 921 is applied to the surfaces of the IML tooling element and the interior of the OML tooling element. For example, in one implementation, the interior of top clamshell half 901 and bottom clamshell half 902 are treated with release agent 921 so that the wing panel may be removed from mold 900 after curing. Also, in this implementation, the exterior surfaces of leading edge mandrel 910, internal bladder section 914, and trailing edge section 918 are treated with release agent 921, so these elements may be removed from the structure after curing. In addition, in this implementation, release agent 921 is applied top the mating surfaces of the OML tooling elements. This implementation is merely exemplary, and other implementations may also be used.

Release agent 921 is a liquid or dry material that facilitates removal of the part from the mold element surfaces without damage to the part surface. In one implementation, release agent 921 is a bond inhibiting agent. For example, Water Shield from Zyvax may be used. This implementation is merely exemplary, and other implementations may also be used.

FIG. 9B has described release agent 820, as shown in FIG. 8A. As shown in FIG. 8A, following release agent 820 is load material stack 830. Load material stack 830 is described in FIGS. 9C-9D.

Figure 9C:
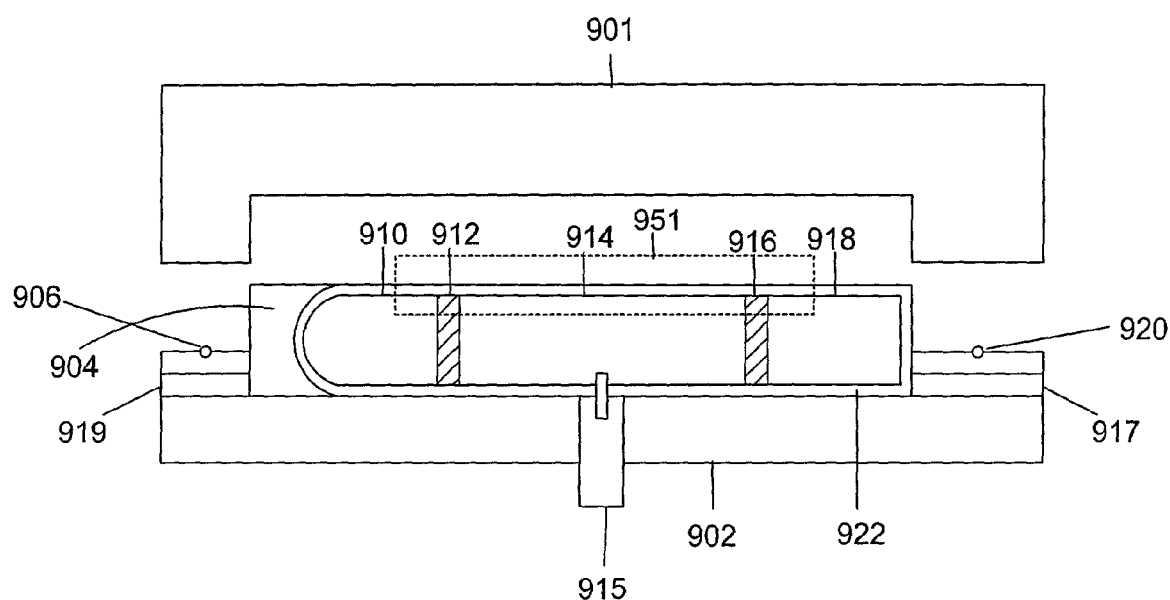
FIG. 9C is an illustrative section view of a mold for a wing panel with a material stack consistent with an embodiment of the invention, as shown in FIGS. 8A-8D.

FIG. 9C is an illustrative section view of a mold for a wing panel with a material stack consistent with an embodiment of the invention, as shown in FIGS. 8A-8D. As shown in FIG. 9C, mold 900 comprises a skin 922 constructed of a material stack (as described in FIGS. 6A-6B). The material stack may be loaded around the outside of leading edge mandrel 910, front spar 912, internal bladder section 914, rear spar 916, and trailing edge section 918 to form the skin 922. Mold 900 also includes internal port 915, top clamshell half 901, bottom clamshell half 902, O-rings 920 and 906, ports 917 and 919, and nose block 904. In one implementation, skin 922 comprises a material stack comprising laminate or core sandwiched by laminate. This implementation is merely exemplary, and other implementations may also be used.

As described above, in one implementation, the application of skin 922 depends on the orientation of the fibers of the laminate layers. In this implementation, the laminate layers are placed in the mold such that the fibers are oriented to provide the greatest strength. Mold 900 is designed to prevent alteration of the orientation of the fibers during resin transfusion. This implementation is merely exemplary, and other implementations may also be used.

Further, in one implementation, the loading of the material stack starts with the placement of the material on the interior of the bottom clamshell half 902 to form the bottom portion of skin 922. After placement of the material stack, leading edge mandrel 910 would be placed in the mold, followed by front spar 912, internal bladder section 914, rear spar 916, and trailing edge section 918. The material stack would then be placed on top of the IML tooling elements and the spars to form the top portion of skin 922. This implementation is merely exemplary, and other implementations may also be used.

Additionally, in one implementation, skin 922 covers the entirety of the IML tooling element and the spars with the exception of portions of the trailing edge section 918. In this implementation, skin 922 on the trailing edge section 918 is broken to allow for the application of flaps and/or ailerons. However, other implementations may include skin 922 that completely covers the IML tooling element. These implementations are merely exemplary, and other implementations may also be used.

As shown in FIG. 9C, skin 922 rests against noseblock section 904. Noseblock section 904 prevents skin 922 from being pinched by top clamshell half 901 upon closing of mold 900.

As also shown in FIG. 9C, a dotted box 951 is depicted along the upper surface of skin 922. Dotted box 951 is described in FIG. 9D.

Figure 9D:
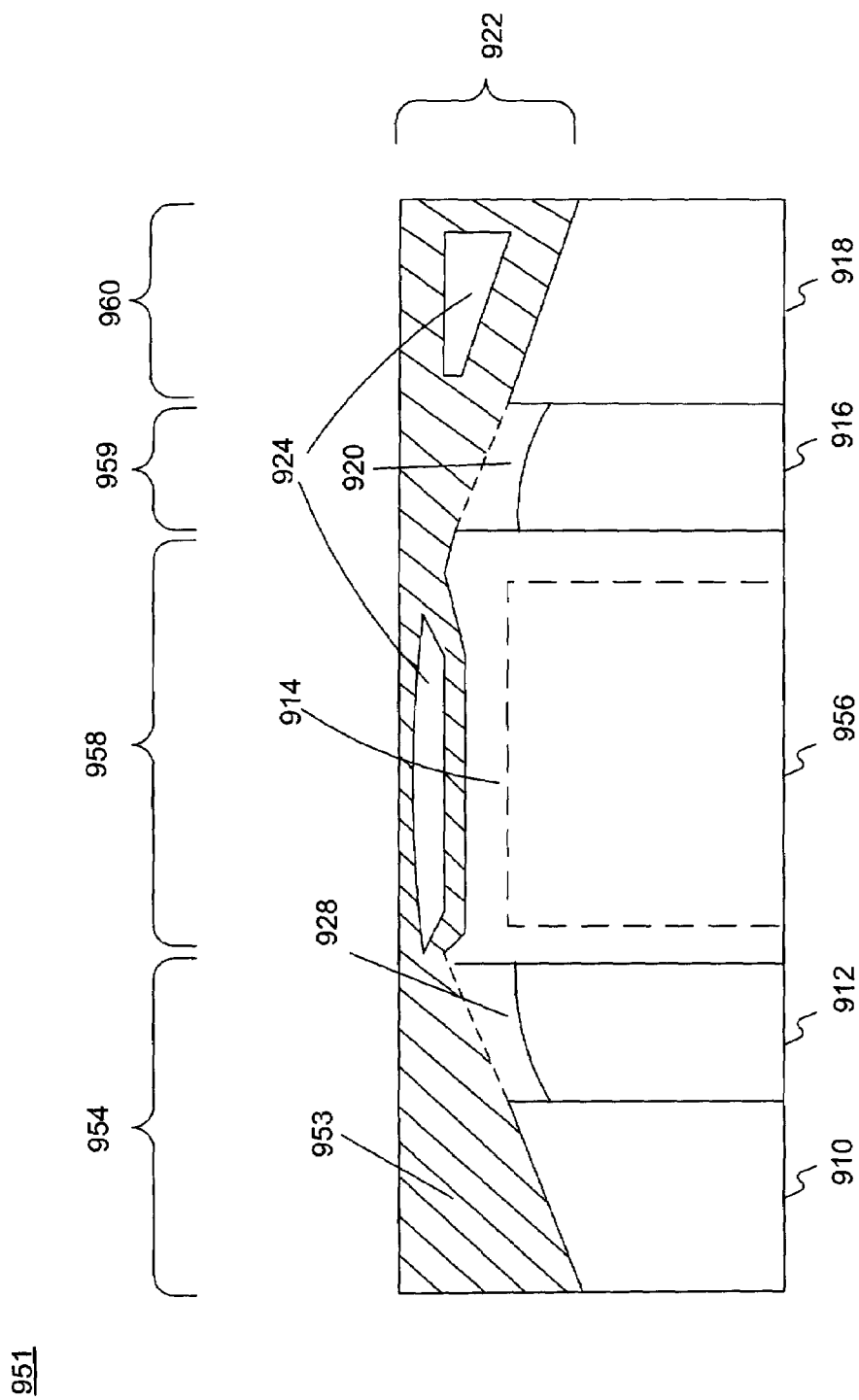
FIG. 9D is a cut-away view of a portion of a skin in a mold for a wing panel consistent with an embodiment of the invention, as shown in FIG. 9C.

FIG. 9D is a cut-away view of a portion of a skin in a mold for a wing panel consistent with an embodiment of the invention, as shown in FIG. 9C. As shown in FIG. 9D, box 951 (from FIG. 9C) comprises a cut-away of mold 900. In this cut-away, skin 922 is on top of leading edge mandrel 910, front spar 912, internal bladder section 914, rear spar 916, and trailing edge section 918. In one implementation, skin 922 consists of material stacks containing a core 924 and laminate 953. In this implementation, skin sections 954 and 959 above leading edge mandrel 910, front spar 912, and rear spar 916 do not contain core 924. However, skin sections 958 and 960 above internal bladder section 914 and trailing edge section 918 do contain core 924. This implementation is merely exemplary, and other implementations may also be used.

Further, in another implementation, internal bladder section 914 forms a fuel tank 956. In this implementation, the material stack containing core 924 is modified to provide greater strength in the area around the fuel tank 956. This implementation is merely exemplary, and other implementations may also be used.

Still further, in another implementation, spar caps 920 and 928 may be placed on spars 912 and 916. Spar caps 920 and 928 are used to carry the structural load of the wing. Spar caps 920 and 928 may be co-cured or co-bonded with the wing panel. This implementation is merely exemplary, and other implementations may also be used.

FIGS. 9C-9D have described load material stack 830, as shown in FIG. 8A. As shown in FIG. 8A, following load material stack 830 is close mold 840. Close mold 840 is described in FIG. 9E.

Figure 9E:
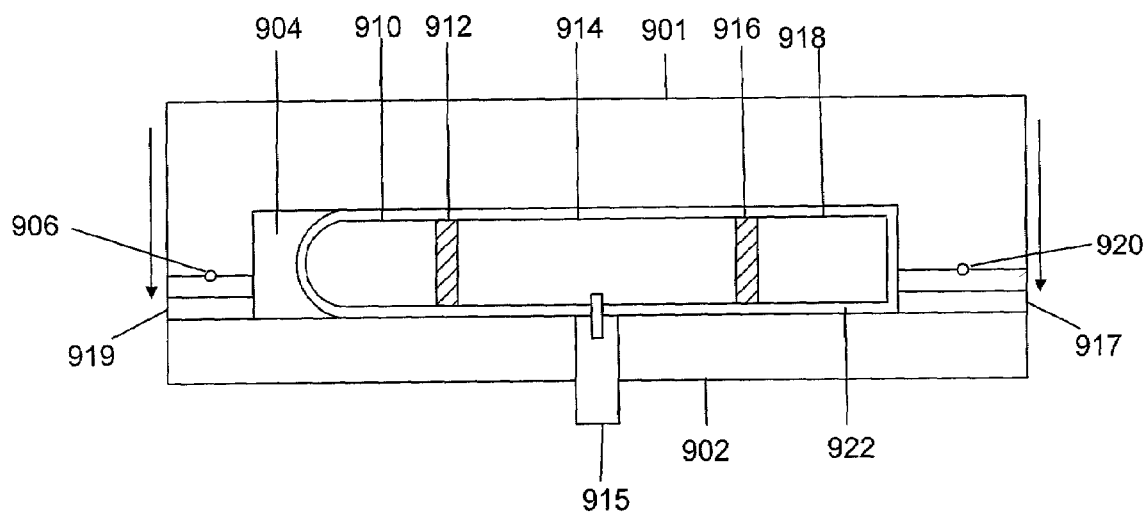
FIG. 9E is an illustrative section view of a closed mold for a wing panel loaded with a material stack consistent with an embodiment of the invention, as shown in FIGS. 8A-8D.

FIG. 9E is an illustrative section view of a closed mold for a wing panel loaded with a material stack consistent with an embodiment of the invention, as shown in FIGS. 8A-8D. As shown in FIG. 9E, mold 900 includes top clamshell half 901 and bottom clamshell half 902, which have been closed around noseblock section 904, skin 922, leading edge mandrel 910, front spar 912, internal bladder section 914, rear spar 916, and training edge section 918. Mold 900 also includes internal port 915, ports 917 and 919, and O-rings 906 and 920. As described above, O-rings 906 and 920 may comprise multiple O-rings or other sealing methods.

FIGS. 8A-9E have described mold process 530, as shown in FIG. 5. As shown in FIG. 5, mold process 530 is followed by infusion process 540. Infusion process 540 is described in FIGS. 10A-11I.

Figure 10A:
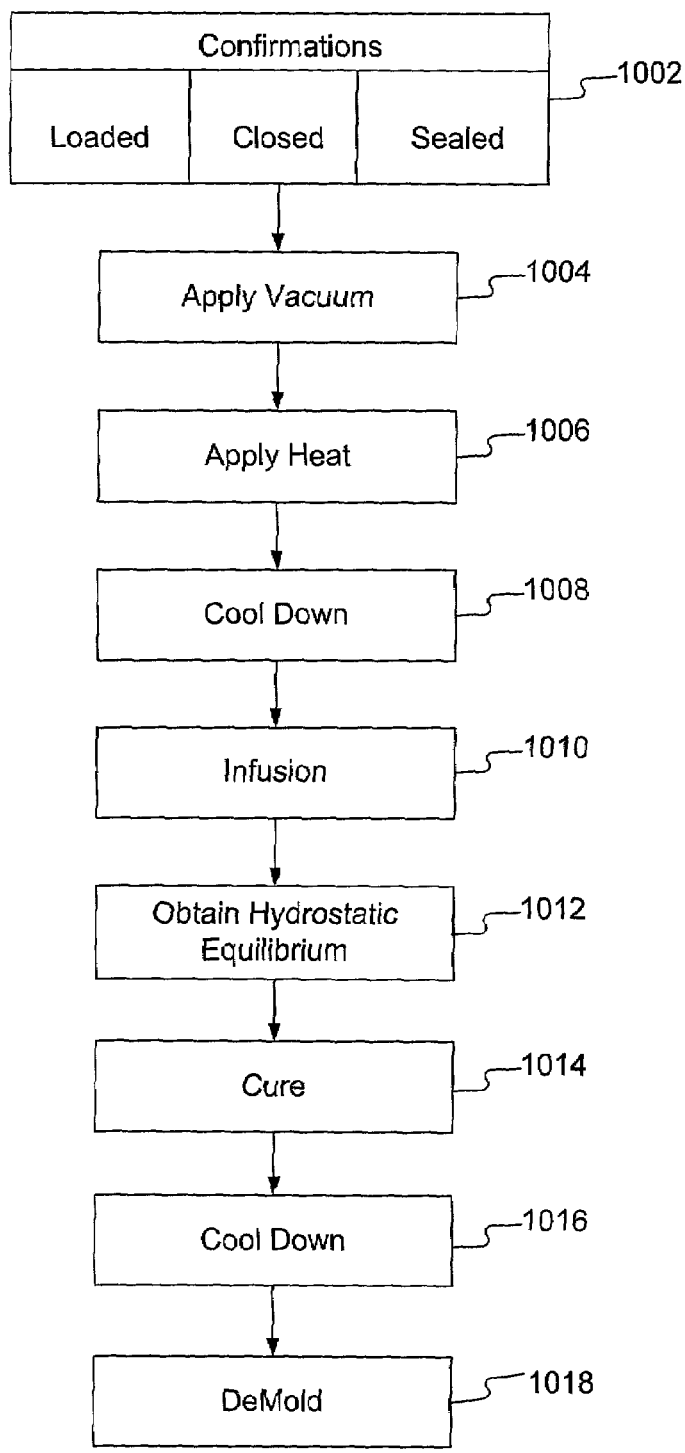
FIG. 10A is a flow diagram illustrating an infusion process in accordance with one embodiment of the invention, as shown in FIG. 5.

FIG. 10A is a flow diagram illustrating an infusion process in accordance with one embodiment of the invention, as shown in FIG. 5. As shown in FIG. 10A, infusion process 1000 begins with confirming that the mold (such as mold 900) is properly loaded with the correct material stack, confirming that the mold is closed, confirming that mold is sealed, and leak checking the mold (stage 1002). This stage is further described in FIG. 11A. Next, vacuum is applied to the interior of the mold (stage 1004). This stage is further described in FIG. 11B. Next, heat is applied to the mold (stage 1006). In one implementation, heat sufficient to cure a seal core material in the material stack is used. This stage is further described in FIG. 11C. Next, the mold is allowed to cool down (stage 1008). Cool down includes lowering the temperature of the mold in preparation for infusion. This stage is further described in FIG. 11C. Next, resin is infused into the mold (stage 1010). In this stage, resin is infused to fill any cavities in the material stacks. This stage is further described in FIG. 11E. Next, a hydrostatic equilibrium is achieved in the mold (stage 1012). A hydrostatic equilibrium includes infusing the mold with resin until the resin pressure going into the mold is equivalent to the resin pressure coming out of the mold. This stage is further described in FIG. 11F. Next, the mold is cured (stage 1014). Cure includes application of heat to the mold under hydrostatic pressure. This stage is further described in FIG. 11G. Next, the mold is allowed again to cool (stage 1016). Cool down includes allowing the temperature of the mold to decrease before removing the mold. In one implementation, this stage is optional. This stage is also further described in FIG. 11H. Finally, following cool down, the structure (e.g. wing panel) and internal mold elements are removed from the external mold elements and then the internal mold elements are removed from the structure (stage 1018). This implementation is merely exemplary, and other implementations may also be used. Some of the other implementations are described in FIGS. 10B-10D.

Figure 10B:
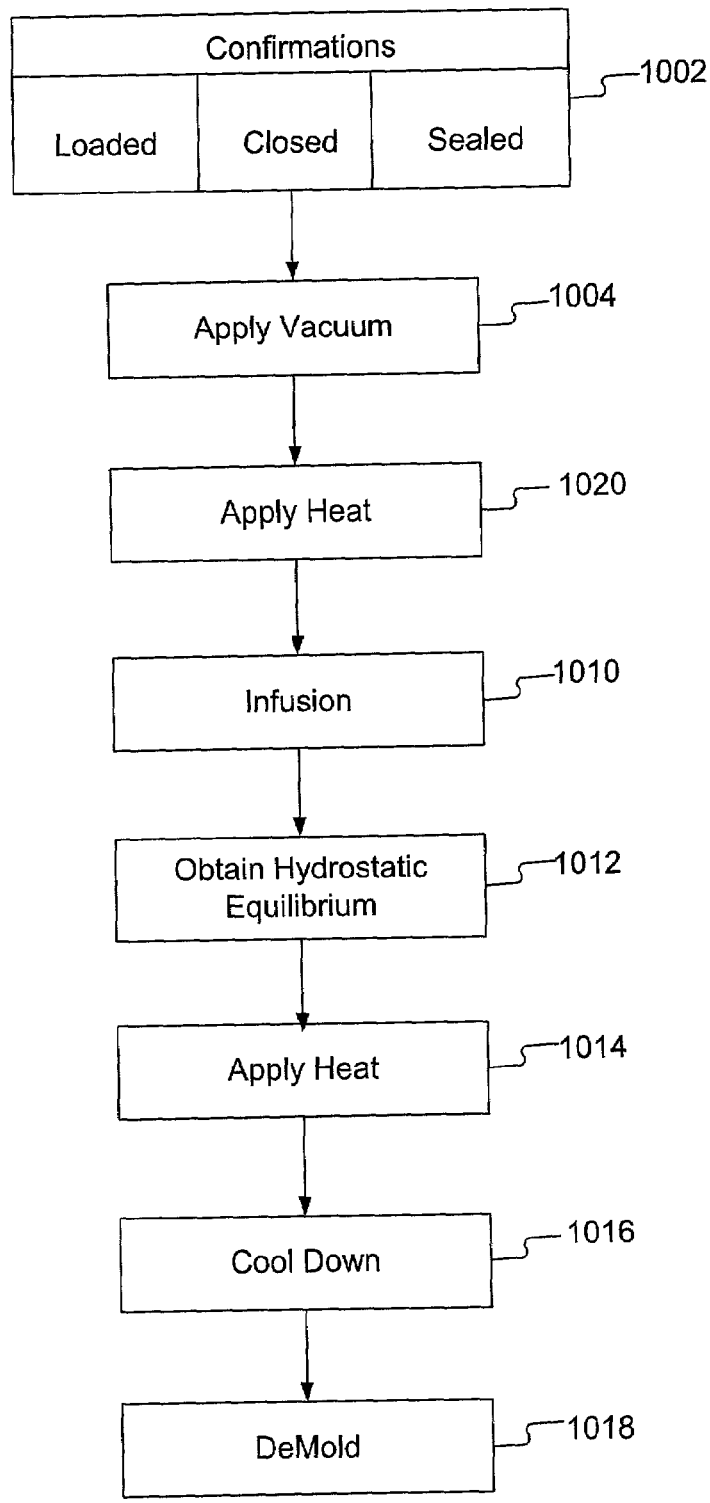
FIG. 10B is a block diagram illustrating an infusion process in accordance with another embodiment of the invention, as shown in FIG. 5.

FIG. 10B is a block diagram illustrating an infusion process in accordance with another embodiment of the invention, as shown in FIG. 5. As shown in FIG. 10B, infusion process 1050 is similar to infusion process 1000 in FIG. 10A. However, in infusion process 1050, apply heat stage 1006 and cool stage down 1008 have been replaced by apply heat stage 1020. In this implementation, apply heat stage 1020 includes increasing the temperature of the mold to a point sufficient to seal core material in the material stack but not higher than the desired temperature for resin infusion. Thus, this implementation does not require cool down 1008, as described in FIG. 10A. This implementation is merely exemplary, and other implementations may also be used.

Figure 10C:
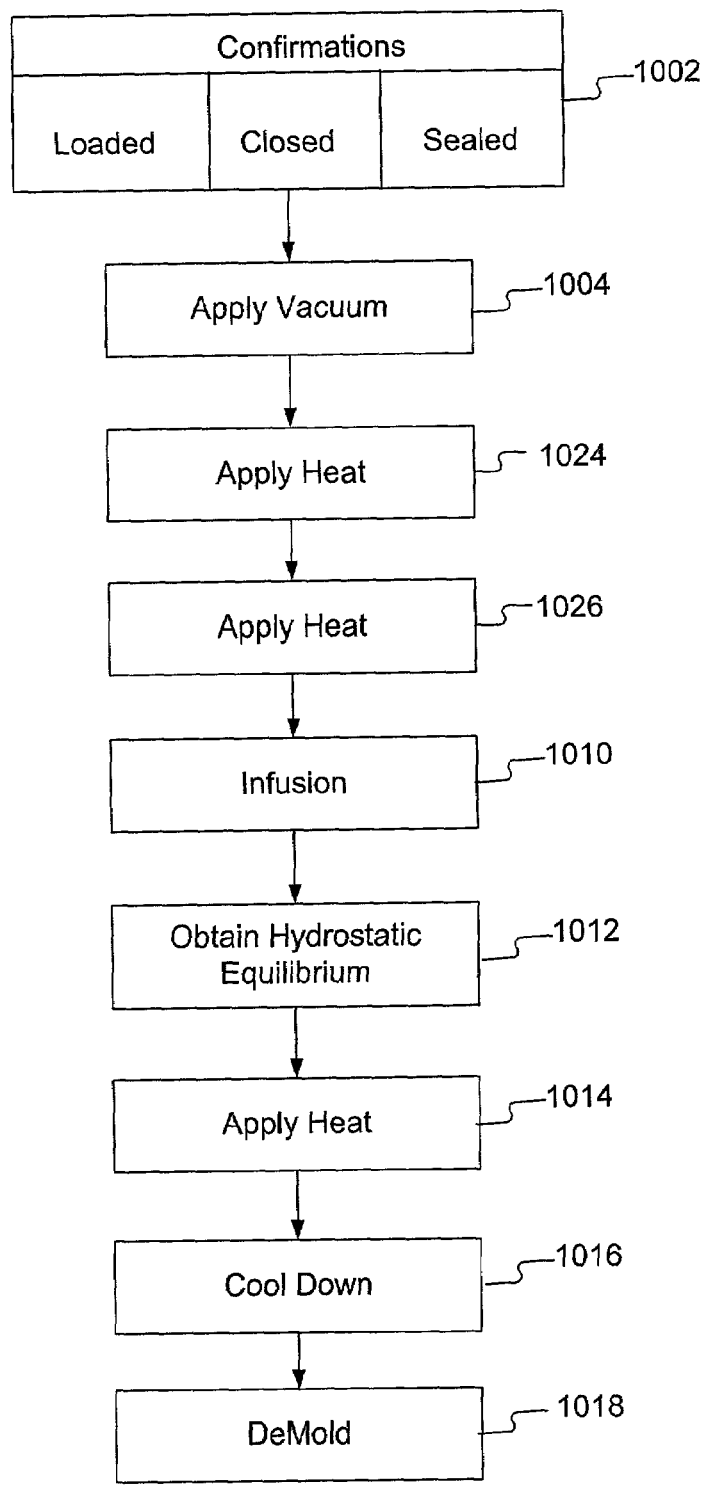
FIG. 10C is a block diagram illustrating an infusion process in accordance with still another embodiment of the invention, as shown in FIG. 5.

FIG. 10C is a block diagram illustrating an infusion process in accordance with still another embodiment of the invention, as shown in FIG. 5. As shown in FIG. 10C, infusion process 1060 is also similar to infusion process 1000 in FIG. 10A. However, in infusion process 1060, apply heat stage 1006 and cool down stage 1008 are replaced by apply heat stage 1024 and apply heat stage 1026. In one implementation, apply heat stage 1024 includes increasing the temperature of the mold to a point sufficient to seal core material in the material stack but less than the appropriate resin infusion temperature. Apply heat stage 1026 includes increasing the temperature of the mold to the proper temperature for resin infusion. This implementation is merely exemplary, and other implementations may also be used.

The embodiments in FIGS. 10A-10C demonstrate how the cure temperatures of the adhesive used to seal core elements and the appropriate temperature for resin infusion affect infusion processes 1000, 1050, and 1060. Therefore, depending on the resin and adhesive chosen, the appropriate temperature for resin infusion may be lower than, higher than, or the same as the cure temperature for the adhesive. Infusion process 1000 in FIG. 10A demonstrates the situation where the appropriate temperature for resin infusion is lower than the cure temperature for the adhesive. Therefore, as shown in FIG. 10A, cool down stage 1008 is required before infusion stage 1010. Infusion process 1050 in FIG. 10B demonstrates the situation where the appropriate temperature for resin infusion and the cure temperature for the adhesive is substantially the same. Therefore, as shown in FIG. 10B, a stage is not needed after apply heat stage 1020 because the mold is at the appropriate temperature for infusion stage 1010. Infusion process 1060 in FIG. 10C demonstrates the situation where the appropriate temperature for resin infusion is higher than the cure temperature for the adhesive. Therefore, as shown in FIG. 10C, a second apply heat stage, i.e. apply heat stage 1026, is needed before infusion 1010.

Figure 10D:
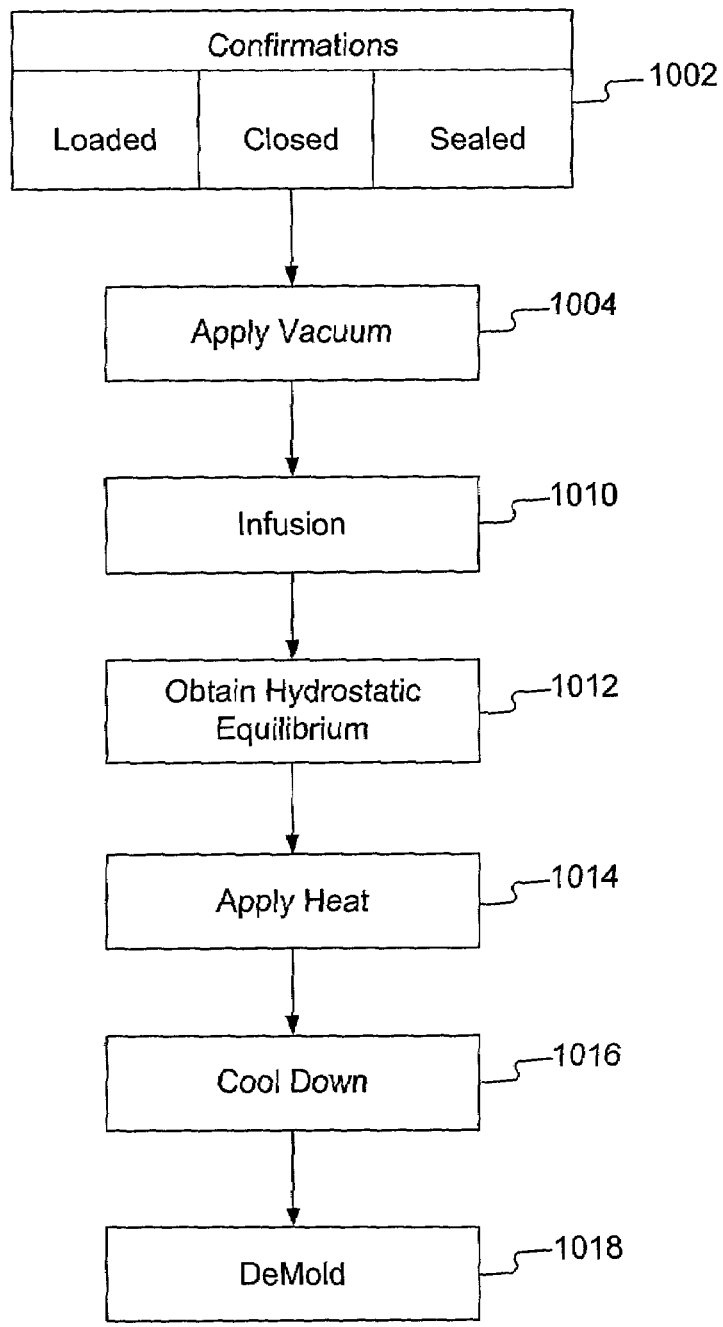
FIG. 10D is a block diagram illustrating an infusion process in accordance with yet another embodiment of the invention, as shown in FIG. 5.

FIG. 10D is a block diagram illustrating an infusion process in accordance with yet another embodiment of the invention, as shown in FIG. 5. As shown in FIG. 10D, infusion process 1070 is also similar to infusion process 1000 in FIG. 10A. However, in infusion process 1070, there is no apply heat stage 1006 and no cool down stage 1008, as in infusion process 1000. Instead, in infusion process 1070, infusion 1010 occurs after apply vacuum 1004. This can be done in this embodiment because the core materials are cured prior to loading of the material stack in the mold. For example, curing of the core material can be done during preparation of the material stack prior to surrounding it with laminate layers.

FIGS. 10B-10D illustrate a variety of implementations of infusion process 1000. These implementations are merely exemplary, and other implementations may also be used.

FIGS. 11A-11I now describe infusion process 1000 in more detail. As shown in FIG. 10A, the first step in infusion process 540 is confirmations stage 1002. Confirmations stage 1002 is described in FIG. 11A.

Figure 11A:
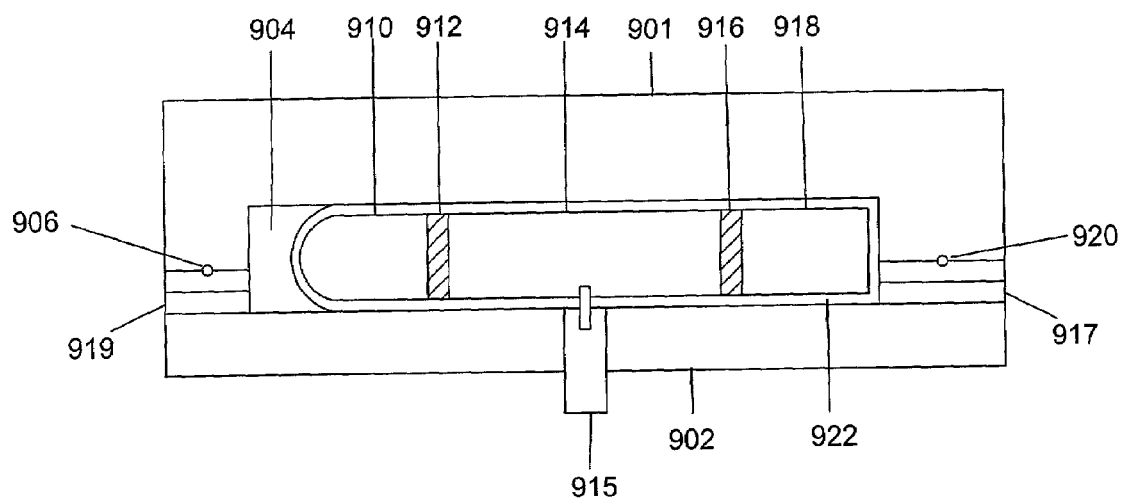
FIG. 11A is an illustrative section view of a mold for a wing panel in a confirmations stage consistent with an embodiment of the invention, as shown in FIG. 10A.

FIG. 11A is an illustrative section view of a mold for a wing panel in a confirmations stage consistent with an embodiment of the invention, as shown in FIG. 10A. As shown in FIG. 11A, mold 1100 shows a material stack 922 in a closed and sealed mold. Top clam shell half 901 and bottom clamshell half 902 have been closed around noseblock section 904, leading edge mandrel 910, front spar 912, internal bladder section 914, rear spar 916, and trailing edge mandrel section 918. Mold 1100 also shows O-rings 906 and 920, which help seal mold 1100 and ports 915, 917, and 919, which may also help seal mold 1100.

In one implementation, confirmation is made that mold 1100 is properly loaded with the correct material stack, that the mold 1100 is closed, and that mold 1100 is sealed. Mold 110 may also be leak checked. This implementation is merely exemplary, and other implementations may also be used.

Figure 11B:
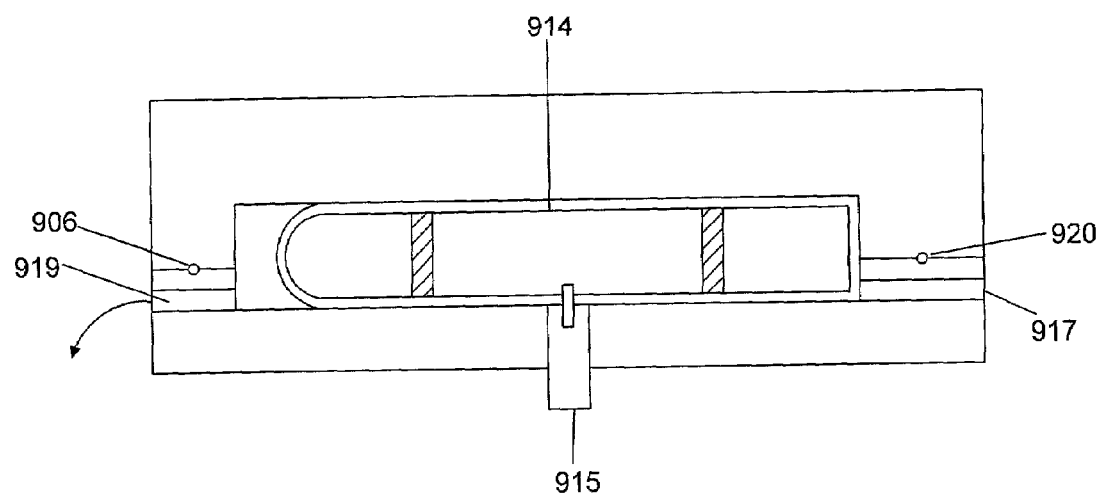
FIG. 11B is an illustrative section view of a mold for a wing panel in a vacuum stage consistent with an embodiment of the invention, as shown in FIG. 11A.

FIG. 11B is an illustrative section view of a mold for a wing panel in a vacuum stage consistent with an embodiment of the invention, as shown in FIG. 11A. As shown in FIG. 11B, a vacuum source (not shown) is applied to mold 1110. In one implementation, the vacuum source may be applied to one port, e.g. port 919, while port 917 is closed. In another implementation, the vacuum may be applied from port 917, while port 919 is closed. In still another implementation, the vacuum may be applied to both ports 917 and 919. In one implementation, the vacuum level inside mold 900 is at most 2 Torr. These steps may be performed using any vacuum source capable of creating a sufficient vacuum. These implementations are merely exemplary, and other implementations may also be used.

Following creation of a vacuum, mold 1110 is checked for leaks. In one test protocol, leakage must be less than 5 inches of Hg in a 5-minute period. However, other implementations and other test protocols may be used. As shown in FIG. 11B, mold 900 includes O-ring seals 906 and 920. In one implementation, O-ring seals 906 and 920 are dimensioned to minimize leakage after the mold is closed. These implementations are merely exemplary, and other implementations may also be used.

In one implementation, a vacuum source may be exposed to internal bladder section 914 using port 915 to create a low pressure condition inside internal bladder section 914. In another implementation, pressure may be applied to internal bladder section 914 via port 915. A pressure source (not shown) may control the pressure inside internal bladder section 914 using port 915. These implementations are merely exemplary, and other implementations may also be used.

Figure 11C:
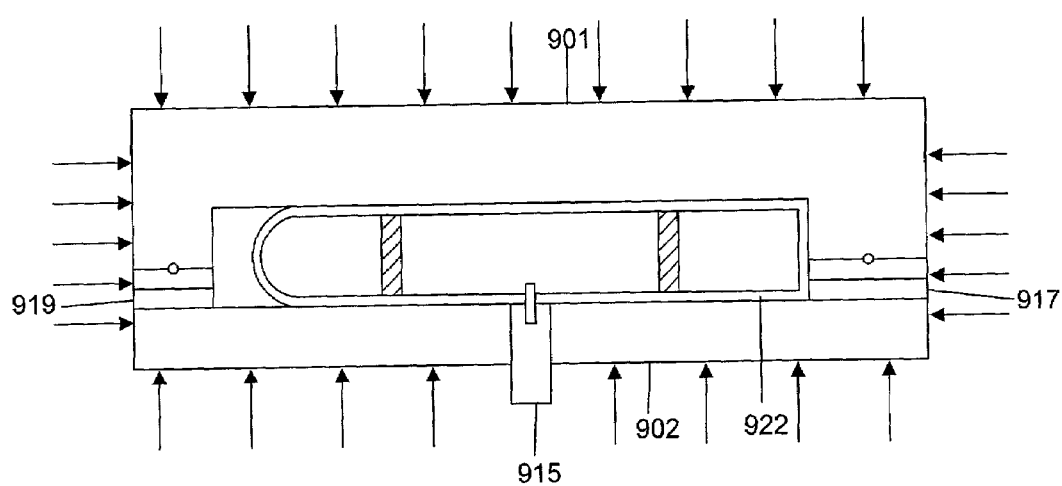
FIG. 11C is an illustrative section view of a mold for a wing panel in a heat stage consistent with an embodiment of the invention, as shown in FIG. 11B.

FIG. 11C is an illustrative section view of a mold for a wing panel in a heat stage consistent with an embodiment of the invention, as shown in FIG. 11B. As shown in FIG. 11C, mold 1120 maybe heated and pressed. In one implementation, heat is applied to the exterior of top clamshell half 901 and bottom clam shell half 902. The heat can be applied using an oven, an autoclave, a press, or any other method of applying heat to an object. In an implementation using an autoclave, the autoclave presses top clamshell half 901 and bottom clamshell half 902 together. In this implementation, ports 917 and 919 are closed and port 915 is open to allow the internal bladder section 914 to vent to the autoclave atmosphere. Therefore, pressure exists on both sides of skin 922. In an implementation using a press, the press presses top clamshell half 901 and bottom clam shell half 902 together. In this implementation, ports 917 and 919 would be closed and compressed gas would be placed in internal bladder section 914 using port 915. A press with heated plates may also be used. In one implementation, this stage may be used to cure the adhesive in a material stack, thereby sealing a core material. These implementations are merely exemplary, and other implementations may also be used.

Figure 11D:
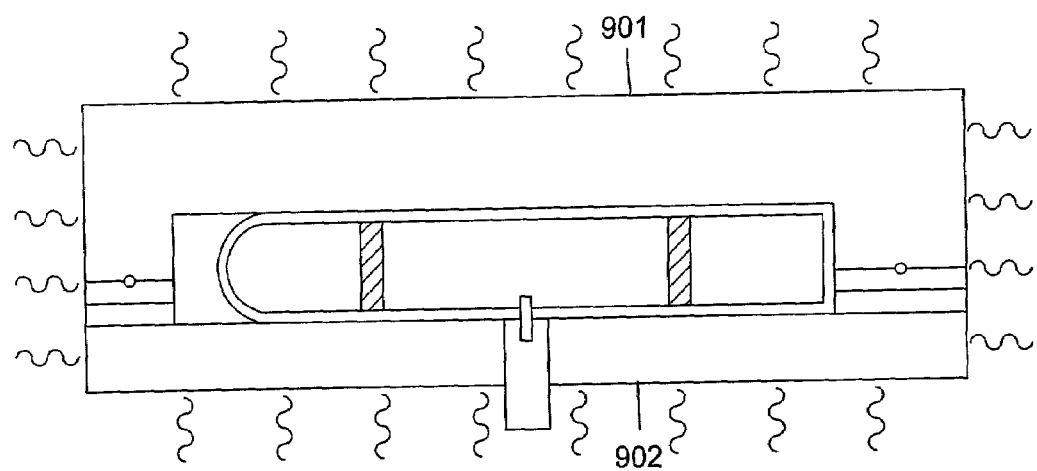
FIG. 11D is an illustrative section view of a mold for a wing panel in a cool down stage consistent with an embodiment of the invention, as shown in FIG. 11C.

FIG. 11D is an illustrative section view of a mold for a wing panel in a cool down stage consistent with an embodiment of the invention, as shown in FIG. 11C. As shown in FIG. 11D, mold 1130 may be cooled, after the heating stage, as described in FIG. 11C. In this implementation, heat is dissipating from top clamshell half 901 and bottom clam shell half 902. In this implementation, the temperature of halves 901 and 902 are lowered to a temperature appropriate for resin infusion. The appropriate temperature will depend on the choice of resin. In one implementation, resin is infused at 130 degrees Fahrenheit at 3 atmospheres. Cooling may be accomplished in this implementation by actively cooling the mold or by allowing ambient atmosphere to gradually cool down the mold. These implementations are merely exemplary, and other implementations may also be used.

Figure 11E:
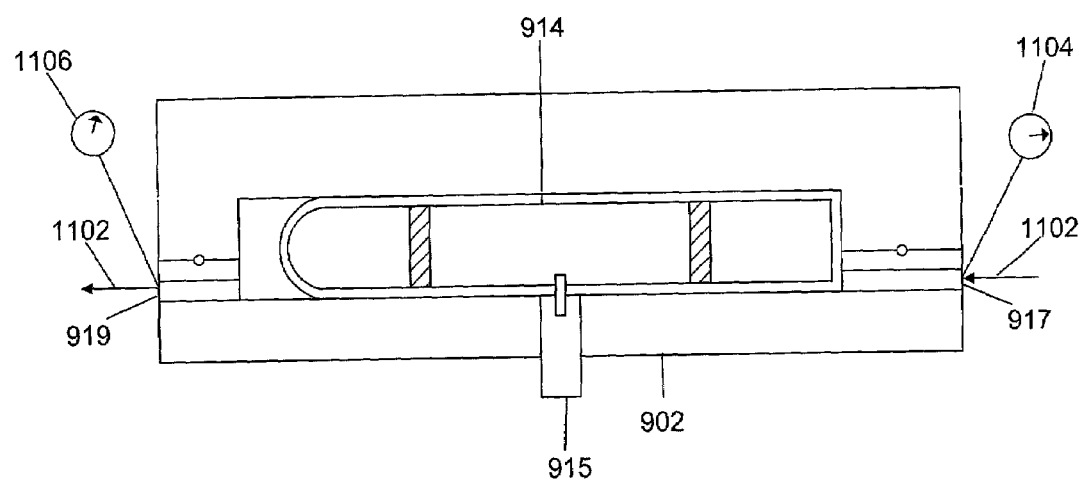
FIG. 11E is an illustrative section view of a mold for a wing panel in an infusion stage consistent with an embodiment of the invention, as shown in FIG. 11D.

FIG. 11E is an illustrative section view of a mold for a wing panel in an infusion stage consistent with an embodiment of the invention, as shown in FIG. 11D. As shown in FIG. 11E, mold 1140 may be infused with resin 1102. In one implementation, resin 1102 is infused through port 917 and evacuated through port 919. In this implementation, resin is infused at 130 degrees Fahrenheit. This implementation is merely exemplary, and other implementations may also be used.

In one implementation, the resin infusion process begins with port 917 being open and with a vacuum being applied to port 919. In one implementation, port 919 has a trap mechanism (not shown) to allow a vacuum to be created in mold 1140 during infusion of resin 1102. A pump (not shown) infuses resin 1102 into mold 1140 through port 919 at a specified pressure while a vacuum continues to be applied to port 919. In one implementation, this resin pressure is 45 psi. However, this pressure can range from 10-200 psi. As shown in FIG. 11E, in these implementations, pressure gauges 1104 and 1106 may be located at ports 917 and 919. When resin 1102 is initially pumped into mold 1140, the pressure at port 917 will be the pressure at which resin 1102 is being introduced. However, the pressure at port 919 will reflect a low pressure reading due to the vacuum source, as shown in FIG. 11E.

As more resin enters port 917, some resin may start to evacuate port 919. In this implementation, at the point that resin begins filling port 919, a vacuum is no longer applied at port 919. As resin 1102 begins to exit port 919, the pressure measured at port 919 will increase. This implementation is merely exemplary, and other implementations may also be used.

In another implementation, pressure may be applied through port 915 to internal bladder section 914 to balance the pressure in internal bladder section 914 against the pressure of resin 1102 entering mold 1140. This halts the resin flow in the mold. Pressurizing internal bladder section 914 removes excess resin, consolidates laminate layers, and minimizes voids. These implementations are merely exemplary, and other implementations may also be used.

As described above, infusion of resin 1102 may cause a shift in the fiber orientation of the material stack. In one implementation, as described above, the geometry of the tool is precisely controlled to reduce alteration of the fiber orientation. In addition, in this implementation, the pressure inside mold 1140 may also be controlled to offset the effect of the pressure of resin infusion. This will also reduce alteration of the fiber orientation. This implementation is merely exemplary, and other implementations may also be used.

Figure 11F:
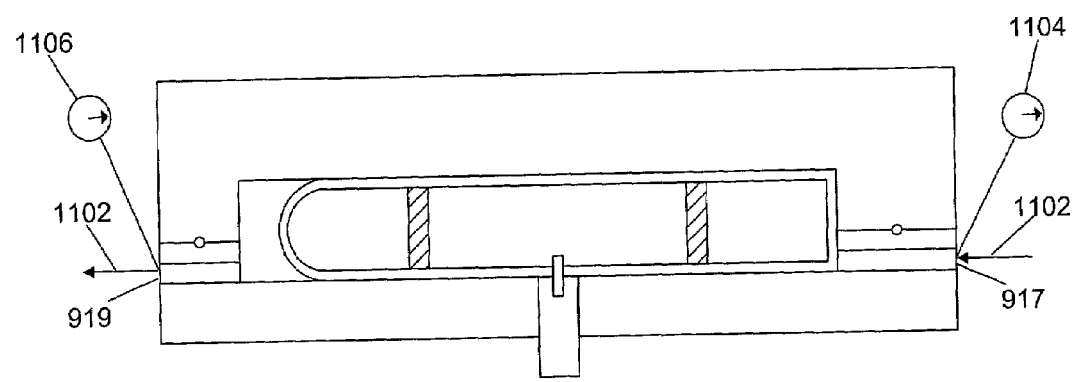
FIG. 11F is an illustrative section view of a mold for a wing panel in a hydrostatic equilibrium stage consistent with an embodiment of the invention, as shown in FIG. 11E.

FIG. 11F is an illustrative section view of a mold for a wing panel in a hydrostatic equilibrium stage consistent with an embodiment of the invention, as shown in FIG. 11E. As shown in FIG. 11F, mold 1150 may be placed into a hydrostatic equilibrium. In one implementation, hydrostatic equilibrium is obtained when the resin pressure entering port 917 equals the resin pressure coming out of mold 1150 at port 919, as shown on pressure gauges 1104 and 1106. This condition indicates that all the cavities within the material stack have been filled with resin 1102. In this implementation, mold 1150 will be held at hydrostatic equilibrium for a few minutes to ensure that all cavities have been filled. The amount of time to hold equilibrium, depends on the size and shape of the part. In one implementation, equilibrium is held from 30 minutes to one hour. This implementation is merely exemplary, and other implementations may also be used.

Figure 11G:
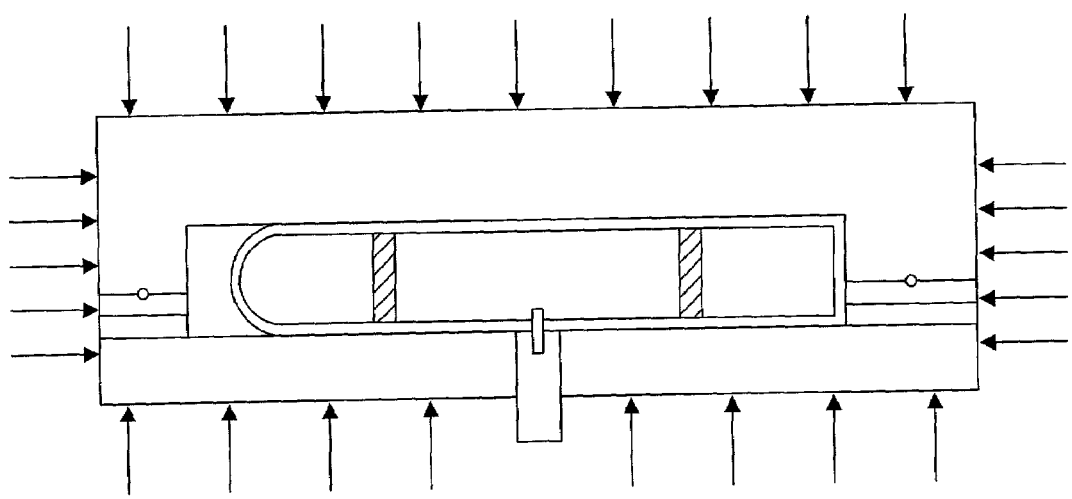
FIG. 11G is an illustrative section view of a mold for a wing panel in a cure stage consistent with an embodiment of the invention, as shown in FIGS. 11F.

FIG. 11G is an illustrative section view of a mold for a wing panel in a cure stage consistent with an embodiment of the invention, as shown in FIG. 11F. In one implementation, heat is applied to cure resin 1102 in mold 1160. In this implementation, the outer mold elements of mold 1160 are clamped together (not shown) and placed in an oven and heated (not shown). In another implementation, mold 1160 is placed in an autoclave where heat and pressure is applied. In still another implementation, heated platens are pressed against either side of mold 1160. Additionally, other methods described in FIG. 11C may be used to cure resin 1102. These implementations are merely exemplary, and other implementations may also be used.

The temperature to which mold 1160 is heated depends on the material stack and resin. In one implementation, mold 1160 is heated to 270 degrees Fahrenheit to cure the structure and then to 300 degrees Fahrenheit to post-cure the structure. Post curing allows for increased strength in the structure. This implementation is merely exemplary, and other implementations may also be used.

Figure 11H:
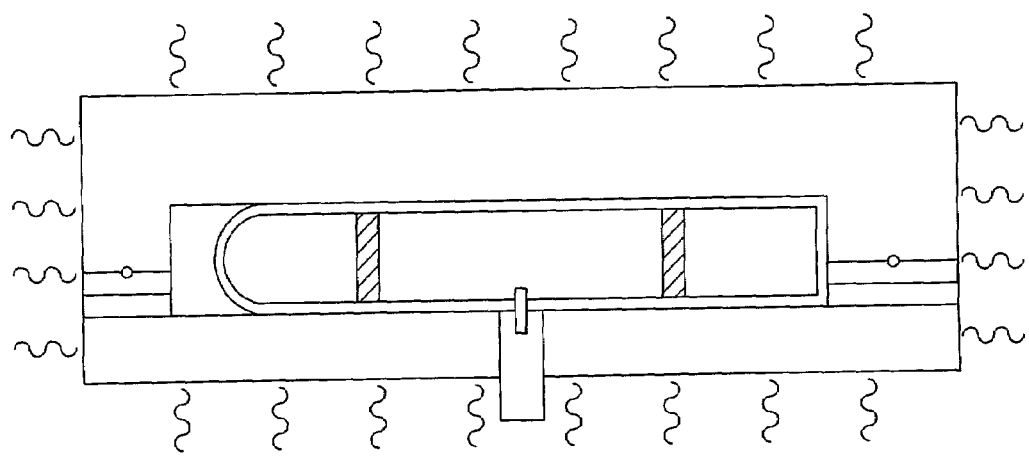
FIG. 11H is an illustrative section view of a mold for a wing panel in a cool down stage after curing consistent with an embodiment of the invention, as shown in FIG. 11G.

FIG. 11H is an illustrative section view of a mold for a wing panel in a cool down stage after curing consistent with an embodiment of the invention, as shown in FIG. 11G. As shown in FIG. 11H, mold 1170 may be cooled after the cure stage, as described in FIG. 11G. In this implementation, heat is dissipating from mold 1170. Additionally, other methods described in FIG. 11D may be used to cool down mold 1170. This implementation is merely exemplary, and other implementations may also be used.

Figure 11I:
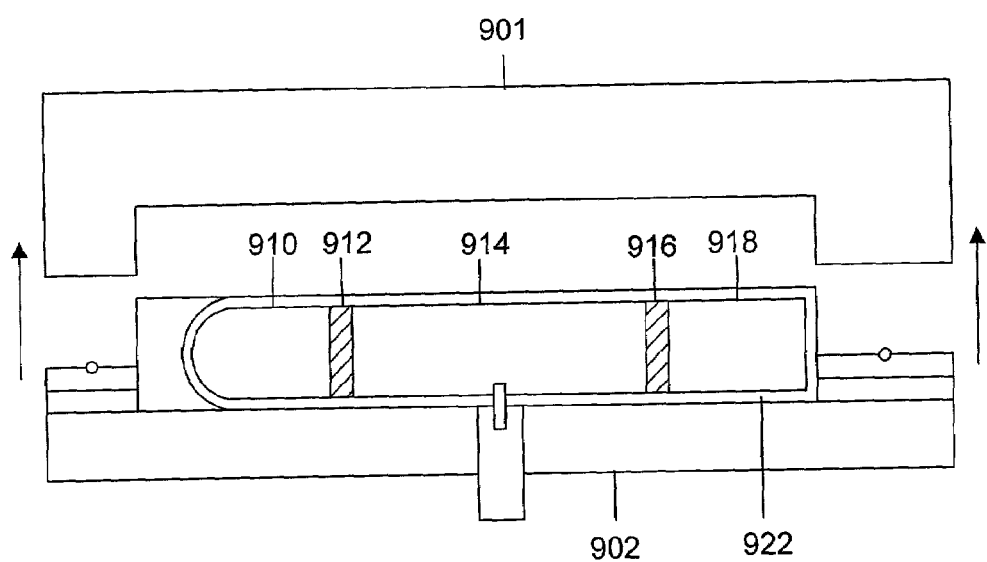
FIG. 11I is an illustrative section view of a mold for a wing panel in a demold stage consistent with an embodiment of the invention, as shown in FIG. 11H.

FIG. 11I is an illustrative section view of a mold for a wing panel in a demold stage consistent with an embodiment of the invention, as shown in FIG. 11H. As shown in FIG. 11I, mold 1180 may be disassembled, or demolded, to remove the molded composite structure, such as a wing panel. In one implementation, mold 1180 may be demolded when it reaches 180 degrees Fahrenheit either during or after cool down. In this implementation, the wing panel is removed from top clamshell half 901 and bottom clam shell half 902. The wing panel comprises the co-cured skin 922 and the co-cured spars 912 and 916. In addition, this wing panel comprises leading edge mandrel 910, internal bladder section 914, and trailing edge mandrel section 918 in its interior. In this implementation, these are removed. Other implementations may be used.

With regard to FIG. 11I, as described above, the elements of mold 1180 may have a different coefficient of thermal expansion than one another and/or the molded composite structure. Thus, upon cool down, as described in FIG. 11H, mold 1170 (in FIG. 11H) or mold 1180 (in FIG. 11I) could contract in such a way as to damage the mold or the molded composite structure. In one implementation, mold 1180 may accommodate thermal expansion. In another implementation, tooling may be allowed to shrink relative to the molded composite structure and allow the molded composite structure to move in the tool, so that the molded composite structure is not placed under strain or stress. For example, in this implementation, the molded composite structure may expand relative to the tooling during cool down. Similarly, in this implementation, the root end of the molded composite structure may move relative to the main body of the tooling to relieve stress during cool down. This implementation is merely exemplary, and other implementations may also be used.

FIGS. 10A-11I have described infusion process 540, as shown in FIG. 5. As shown in FIG. 5, infusion process 540 results in the creation of a structure, such as a wing panel. An example of a wing panel is shown in FIG. 12.

Figure 12:
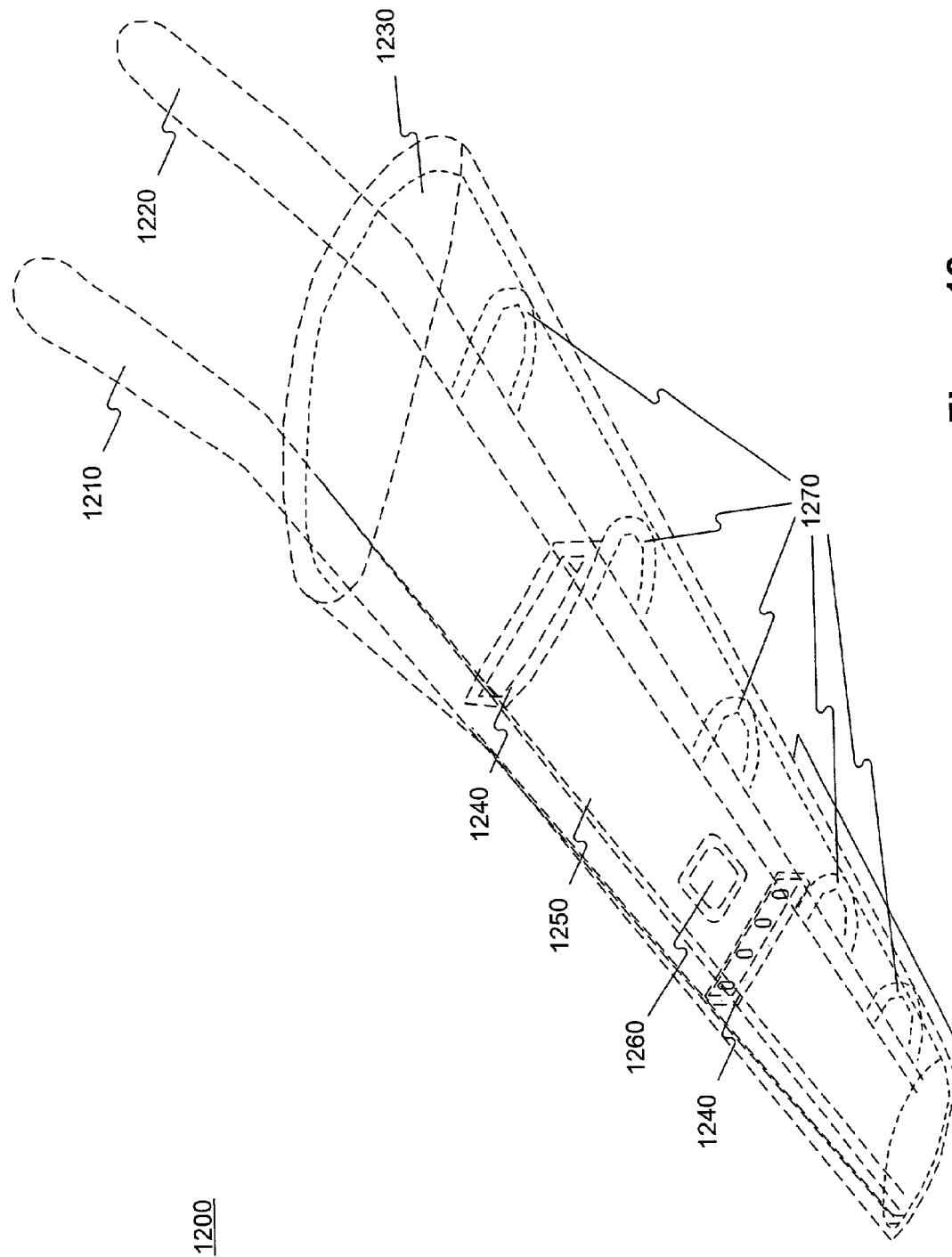
FIG. 12 is a perspective view of a wing panel manufactured consistent with an embodiment of the invention.

FIG. 12 is a perspective view of a wing panel manufactured consistent with an embodiment of the invention. As shown in FIG. 12, in one implementation, a wing panel 1200 comprises skin 1230, co-cured spars 1210 and 1220, and co-cured ribs 1270 for support of hinges for ailerons or flaps (not shown). In this embodiment, all of the elements of wing panel 1200 are manufactured according to the described processes, e.g. RTM process 130 as described in FIG. 5 (and otherwise described herein). Additionally, in this implementation, other elements may be formed in wing panel 1200. For example, a fuel tank 1260 could be formed in the structure. Fuel tank ribs 1240 could also be included to be co-cured with the rest of the structure to support fuel tank 1260. Other elements may also be formed in wing panel 1200. This implementation is merely exemplary, and other implementations may also be used.

In one implementation, skin 1230 will result in a smooth laminar flow of air over wing panel 1200. In this implementation, a smooth laminar flow of air includes a streamlined flow of a fluid (i.e. air) over wing panel 1200 with little turbulence. This implementation is merely exemplary, and other implementations may also be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A method of manufacturing a molded composite structure, comprising:
    preparing a material stack, wherein the material stack comprises a core section having first and second opposing sides, and wherein preparing the material stack comprises:
    applying first and second substantially fibrous support layers on the first side and the second opposing side of the core section, wherein the substantially fibrous support layers provide a vacuum path for evacuation of the core section;
    applying an adhesive layer on the first and second support layers and on any other surface of the core not covered by the first and second support layers; and
    applying a thermoplastic barrier layer on the adhesive layers covering all surfaces of the core;
    preparing a resin;
    preparing a mold;
    placing the material stack in the mold;
    evacuating air from the core section of the material stack through the vacuum path provided by the substantially fibrous support layers;
    sealing the evacuated core section by curing the adhesive layer to adhere the support layers and thermoplastic barrier layer to the core section such that after sealing, the thermoplastic barrier layer prevents air from entering the core section, thereby forming an evacuated material stack;
    infusing the mold and the evacuated material stack with the resin to form the structure;
    curing the structure; and
    removing the structure from the mold.

2. The method of claim 1, wherein material stack preparing further comprises:
    applying a laminate layer on at least one of the first side and the second side of the core section.

3. The method of claim 1, wherein material stack preparing further comprises:
    preparing at least two material stacks, wherein at least one of the material stacks comprises a core section having first and second opposing sides and at least one of the material stacks does not comprise a core section.

4. The method of claim 1, wherein material stack preparing further comprises:
    applying a laminate layer on the thermoplastic barrier layer.

5. The method of claim 4, wherein laminate layer applying further comprises:
    applying the laminate layer with a specified fiber orientation.

6. The method of claim 5, wherein mold preparing further comprises:
    reducing the modification of the fiber orientation during resin infusion.

7. The method of claim 6, wherein the mold comprises a shape and an internal pressure and wherein reducing further comprises:
    altering the shape and the internal pressure of the mold.

8. The method of claim 1, wherein mold preparing further comprises:
    preparing a first tool to form an exterior shape of the structure; and
    preparing a second tool to form an interior shape of the structure.

9. The method of claim 8, wherein the second tool includes an elastomeric tool.

10. The method of claim 1, wherein placing further comprises:
    applying a release agent to the mold and to the material stack; and
    placing the material stack in the mold.

11. The method of claim 1, wherein the material stack includes cavities, and wherein infusing further comprises:
    closing the mold;
    sealing the mold;
    creating a vacuum in the mold; and
    infusing the mold with the resin until the cavities in the material stack are filled with resin.

12. The method of claim 1, wherein curing the structure further comprises:
    applying heat to the mold.

13. The method of claim 1, wherein curing the structure further comprises:
    applying pressure to the mold.

14. The method of claim 1, wherein the structure has an exterior surface resulting in a smooth laminar flow of air over that surface.

15. The method of claim 1, wherein the structure is a wing panel for an aircraft.

16. The method of claim 1, wherein the structure is a semi-span wing for an aircraft.

17. The method of claim 1, wherein the structure is a full-span wing for an aircraft.

18. A method of manufacturing a molded composite structure, comprising:
preparing at least one material stack, wherein the material stack comprises a core section and cavities, wherein the core section comprises first and second opposing sides, and wherein preparing the material stack comprises:
applying first and second substantially fibrous support layers on the first side and the second opposing side of the core section, wherein the substantially fibrous support layers provide a vacuum path for evacuation of the core section;
applying an adhesive layer on the first and second support layers and on any other surface of the core not covered by the first and second support layers; and
applying a thermoplastic barrier layer on the adhesive layers covering all surfaces of the core;
preparing a resin;
preparing a first tool to form an exterior shape of the structure;
preparing a second tool to form an interior shape of the structure;
integrating the second tool with the material stack;
placing the material stack with the second tool inside of the first tool;
evacuating air from the core section of the material stack through the vacuum path provided by the substantially fibrous support layers;
sealing the evacuated core section by curing the adhesive layer to adhere the support layers and thermoplastic barrier layer to the core section such that after sealing, the thermoplastic barrier layer prevents air from entering the core section, thereby forming an evacuated material stack;
infusing the first tool with the resin until the cavities in the evacuated material stack are filled with resin to form the structure;
curing the structure;
removing the structure from the first tool; and
removing the second tool from the structure.

19. The method of claim 18, wherein material stack preparing further comprises:
preparing at least two material stacks, wherein at least one of the material stacks comprises a core section having first and second opposing sides and at least one of the material stacks does not comprise a core section.

20. The method of claim 18, wherein material stack preparing further comprises:
applying a laminate layer on the thermoplastic barrier layer.

21. The method of claim 20, wherein laminate layer applying further comprises:
applying the laminate layer with a specified fiber orientation.

22. The method of claim 21, wherein first tool preparing and second tool preparing further comprises:
reducing the modification of the fiber orientation during resin infusion.

23. The method of claim 22, wherein the first tool comprises a shape and an internal pressure and wherein reducing further comprises:
altering the shape and the internal pressure of the first tool.

24. The method of claim 18, wherein the second tool includes an elastomeric tool.

25. The method of claim 24, wherein infusing further comprises:
altering the internal pressure in the elastomeric tool to alter the rate of infusion.

26. The method of claim 18, wherein integrating further comprises:
applying a release agent to the second tool; and placing the second tool in the material stack.

27. The method of claim 18, wherein placing further comprises:
applying a release agent to the first tool; and
placing the material stack with the second tool inside the first tool.

28. The method of claim 18, wherein adhesive layer curing and structure curing occur at substantially the same temperature.

29. The method of claim 18, wherein adhesive layer curing occurs at a higher temperature than structure curing.

30. The method of claim 18, wherein adhesive layer curing occurs at a lower temperature than structure curing.

31. The method of claim 18, wherein infusing further comprises:
sealing the first tool; and
creating a vacuum in the first tool.

32. The method of claim 18, wherein structure curing further comprises:
applying heat to the structure; and
applying pressure to the structure.

33. The method of claim 18, wherein the structure is a wing panel for an aircraft.

34. The method of claim 18, wherein the structure is a semi-span wing for an aircraft.

35. The method of claim 18, wherein the structure is a full-span wing for an aircraft.

36. The method of claim 22, wherein the first tool has an interior surface, and the second tool has an exterior surface, and wherein reducing the modification of the fiber orientation during resin infusion comprises:
aligning the interior surface of the first tool with the exterior surface of the second tool.

37. The method of claim 36, wherein the second tool comprises a semi-rigid thermoplastic bladder.

* * * * *

UNITED STATES PATENT AND TRADEMARK OFFICE
CERTIFICATE OF CORRECTION

| | |
|---|---|
| PATENT NO. | : 7,226,559 B2 |
| APPLICATION NO. | : 10/000148 |
| DATED | : June 5, 2007 |
| INVENTOR(S) | : Michael K. Maxwell et al. |

It is certified that error appears in the above-identified patent and that said Letters Patent is hereby corrected as shown below:

Title Page, Item 54 and Column 1 line 1, "METHOD FOR MOLDING STRUCTURES" should read --METHOD FOR MOLDING COMPOSITE STRUCTURES--.

Signed and Sealed this

Seventh Day of August, 2007

JON W. DUDAS
*Director of the United States Patent and Trademark Office*